United States Patent
Arakawa

(10) Patent No.: US 10,234,301 B2
(45) Date of Patent: Mar. 19, 2019

(54) ROUTE CALCULATION DEVICE, NAVIGATION DEVICE, ROUTE CALCULATION METHOD, NAVIGATION METHOD, AND COMMUNICATION SYSTEM

(71) Applicant: NEC Corporation, Minato-ku, Tokyo (JP)

(72) Inventor: Tomoki Arakawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 131 days.

(21) Appl. No.: 15/127,099

(22) PCT Filed: Jan. 5, 2015

(86) PCT No.: PCT/JP2015/050025
§ 371 (c)(1),
(2) Date: Sep. 19, 2016

(87) PCT Pub. No.: WO2015/146202
PCT Pub. Date: Oct. 1, 2015

(65) Prior Publication Data
US 2017/0108345 A1 Apr. 20, 2017

(30) Foreign Application Priority Data
Mar. 24, 2014 (JP) .................................. 2014-059410

(51) Int. Cl.
*G01C 21/34* (2006.01)
*G01C 21/36* (2006.01)
(Continued)

(52) U.S. Cl.
CPC ....... *G01C 21/3492* (2013.01); *G01C 21/343* (2013.01); *G01C 21/3667* (2013.01);
(Continued)

(58) Field of Classification Search
None
See application file for complete search history.

(56) References Cited

U.S. PATENT DOCUMENTS

| 7,493,056 B2 | 2/2009 | Katou |
| 8,090,529 B2 | 1/2012 | Jo et al. |

(Continued)

FOREIGN PATENT DOCUMENTS

| JP | H10-63637 A | 3/1998 |
| JP | H11-295093 A | 10/1999 |

(Continued)

OTHER PUBLICATIONS

Extended European Search Report for EP Application No. EP15768891.2 dated Dec. 7, 2017.
(Continued)

*Primary Examiner* — Thomas G Black
*Assistant Examiner* — Demetra R Smith-Stewart

(57) ABSTRACT

The present invention provides a route calculation device, a navigation device, a route calculation method, and a navigation device that can calculate a route that allows a user to arrive at a destination or a stop-off point within a determined time period. The route calculation device according to the present invention includes a communication available hours acquisition unit 11 that acquires communication available hours of a plurality of branch stations that establish communication with a mobile station, a reference time acquisition unit 12 that acquires a reference time, a road information acquisition unit 13 that acquires time information of a road section, and a route calculation unit 31 that calculates a first travel route that offers the shortest required time for stopping by the branch stations based on the communication available hours, the reference time, and the time information of a road section.

19 Claims, 19 Drawing Sheets

(51) Int. Cl.
*G08G 1/0968* (2006.01)
*G06Q 10/04* (2012.01)
*H04W 4/04* (2009.01)
*G08G 1/0969* (2006.01)

(52) U.S. Cl.
CPC ......... *G06Q 10/047* (2013.01); *G08G 1/0969* (2013.01); *G08G 1/09685* (2013.01); *G08G 1/096805* (2013.01); *G08G 1/096827* (2013.01); *G08G 1/096838* (2013.01); *G08G 1/096883* (2013.01); *H04W 4/046* (2013.01)

(56) References Cited

U.S. PATENT DOCUMENTS

| | | |
|---|---|---|
| 2007/0237529 A1 | 10/2007 | Katou |
| 2007/0288155 A1 | 12/2007 | Kaneda |
| 2008/0033633 A1* | 2/2008 | Akiyoshi ............. G01C 21/343 |
| | | 701/418 |
| 2008/0165032 A1 | 7/2008 | Lee et al. |
| 2008/0294334 A1 | 11/2008 | Jo et al. |
| 2010/0198508 A1 | 8/2010 | Tang |
| 2011/0112759 A1* | 5/2011 | Bast .................... G01C 21/3423 |
| | | 701/533 |
| 2012/0059578 A1* | 3/2012 | Venkatrannan ........ G01C 21/20 |
| | | 701/411 |
| 2013/0006464 A1* | 1/2013 | Speiser .................... G08G 1/01 |
| | | 701/25 |
| 2013/0261860 A1 | 10/2013 | Oyama et al. |

FOREIGN PATENT DOCUMENTS

| | | |
|---|---|---|
| JP | 3377405 B2 | 2/2003 |
| JP | 2006-119055 A | 5/2006 |
| JP | 2007-218742 A | 8/2007 |
| JP | 2007-281742 A | 10/2007 |
| JP | 2008-065421 A | 3/2008 |
| JP | 2009-518733 A | 5/2009 |
| JP | 2013-211007 A | 10/2013 |

OTHER PUBLICATIONS

International Search Report for PCT Application No. PCT/JP2015/050025, dated Mar. 3, 2015.

* cited by examiner

ROUTE CALCULATION DEVICE, NAVIGATION DEVICE, ROUTE CALCULATION METHOD, NAVIGATION METHOD, AND COMMUNICATION SYSTEM

This application is a National Stage Entry of PCT/JP2015/050025 filed on Jan. 5, 2015, which claims priority from Japanese Patent Application 2014-059410 filed on Mar. 24, 2014, the contents of all of which are incorporated herein by reference, in their entirety.

TECHNICAL FIELD

The present invention relates to a route calculation device, a navigation device, a route calculation method, a navigation method, and a communication system.

BACKGROUND ART

There is a car navigation device that calculates an optimal route for a destination and stop-off points input by a user (Patent Document 1). There is an invention in which working data is stored in a car navigation device and the status of the work is automatically updated when the car arrives at a target place in monitoring or the like for maintenance of gas main pipes (Patent Document 2). Here, there is a need for a car to stop by plural branch stations (devices that collect information and transmit the information to a device with which communication is established) and collect information while traveling. Furthermore, power saving by intermittently operating branch stations is now under consideration.

CITATION LIST

Patent Document(s)

Patent Document 1: JP 2007-281742 A
Patent Document 2: JP 2008-065421 A

BRIEF SUMMARY OF THE INVENTION

Problem to be Solved by the Invention

In the above-described related arts, routes are determined simply based on the traffic information and the geographic locations of destinations and stop-off points. Thus, there was a problem that a user sometimes cannot arrive at a destination or a stop-off point within a determined time period. Furthermore, in a case where a car or the like stops by plural branch stations and collects information, when a branch station is not in operating hours (hereinafter, also referred to as "communication available hours"), for example, there is a time for waiting until the branch station starts operating, and this causes additional work (e.g. to go there again for collecting information at another date), resulting in decrease in work efficiency. Hence, the present invention is intended to provide a route calculation device, a navigation device, a route calculation method, and a navigation device that can calculate a route that allows a user to arrive at a destination or a stop-off point within a determined time period.

Means for Solving Problem

In order to achieve the above object, the present invention provides a route calculation device including: a communication available hours acquisition unit that acquires communication available hours of a plurality of branch stations that establish communication with a mobile station; a reference time acquisition unit that acquires a reference time; a road information acquisition unit that acquires time information of a road section; and a route calculation unit that calculates a first travel route that offers a shortest required time for stopping by the branch stations based on the communication available hours, the reference time, and the time information of a road section.

The present invention also provides a navigation device including; the route calculation device according to the present invention, including: the communication available hours acquisition unit; the reference time acquisition unit; the road information acquisition unit; and the route calculation unit; and a display unit, wherein the display unit displays the first travel route calculated by the route calculation device.

The present invention also provides a route calculation method including following steps: acquiring communication available hours of a plurality of branch stations that establish communication with a mobile station; acquiring a reference time; acquiring time information of a road section; and calculating a first travel route that offers a shortest required time for stopping by the branch stations based on the communication available hours, the reference time, and the time information of a road section.

The present invention also provides a navigation method, including: the route calculation method according to the present invention including: the communication available hours acquisition step; the reference time acquisition step; the road information acquisition step; and the route calculation step; and following step: displaying, wherein the first travel route calculated by the route calculation method is displayed in the display step.

The present invention also provides a program that can execute the route calculation method according to the present invention or the navigation method according to the present invention on a computer.

The present invention also provides a recording medium recorded with the program according to the present invention.

The present invention also provides a communication system including: a plurality of branch stations each communicatable within a specific area; and a mobile station that establishes communication with the branch stations, wherein the mobile station can establish communication with the communicatable branch stations via wireless communication, the branch station includes a storage unit that stores data and a transmission unit that transmits the data stored in the storage unit to the mobile station, and the mobile station includes the navigation device according to the present invention and communication means that establishes communication with the branch stations.

EFFECTS OF THE INVENTION

According to the present invention, a route that allows a user to arrive at a destination or a stop-off point within a determined time period can be calculated. Furthermore, according to the present invention, for example, because the user can arrive at a destination or a stop-off point within a determined time period, it is possible to improve the work efficiency in the establishment of communication with the branch stations on the route.

MODE FOR CARRYING OUT THE INVENTION

The route calculation device, the navigation device, the route calculation method, the navigation method, and the communication system according to the present invention are described below with reference to drawings. The present invention, however, is not limited by the following description. Descriptions of embodiments can be referred to one another, unless otherwise stated. Furthermore, configurations of embodiments can be combined, unless otherwise stated. Hereinafter, in FIGS. 1 to 24, identical parts are indicated with identical numerals and symbols, and the descriptions of the identical parts may be omitted. Furthermore, for convenience in explanation, the structure of each component shown in FIGS. 1 to 24 may be appropriately simplified, and the size, the ratio, and the like of components may be schematically shown and different from actual ones.

(First Embodiment)

Figure 1:
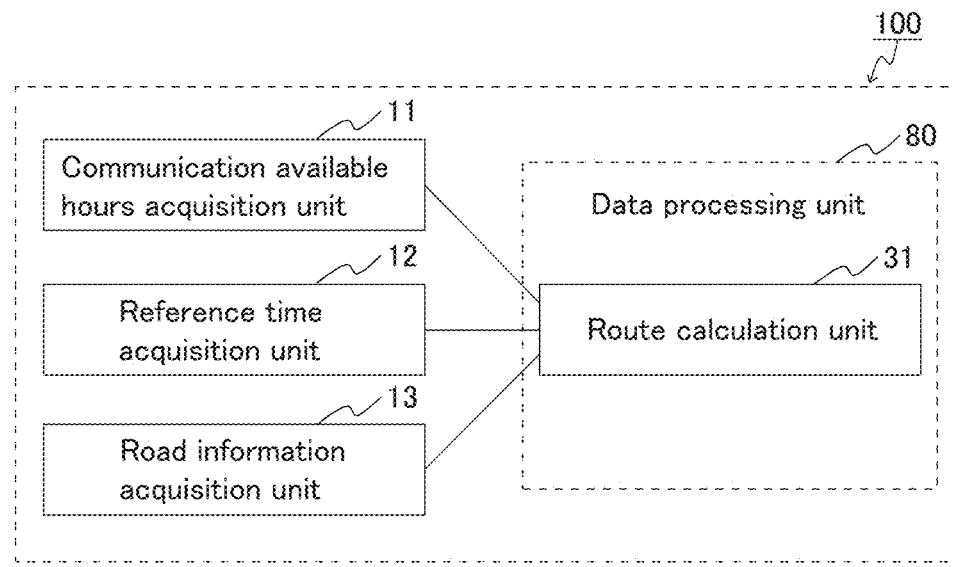
FIG. 1 is a block diagram showing a route calculation device of the first embodiment.

FIG. 1 is a block diagram showing a route calculation device of the present embodiment. As shown in FIG. 1, a route calculation device 100 of the present embodiment includes a communication available hours acquisition unit 11, a reference time acquisition unit 12, a road information acquisition unit 13, and a route calculation unit 31. As shown in FIG. 1, the route calculation unit 31 may be installed in a data processing unit 80. The route calculation unit 31 may be software or hardware in which the software is installed. The data processing unit 80 may include a CPU and the like. In the route calculation device 100 of the present embodiment, the route calculation unit 31 is electrically connected to the communication available hours acquisition unit 11, the reference time acquisition unit 12, and the road information acquisition unit 13.

The communication available hours acquisition unit 11 acquires communication available hours of plural branch stations that establish communication with a mobile station. Examples of the communication available hours acquisition unit 11 include storage units and communication means. Examples of the storage unit include random access memories (RAMs), read-only memories (ROMs), flash memory hard disks (HDs), optical disks, and floppy (registered trademark) disks (FDs). The data storage unit may be a built-in type or an external type such as an external storage device. The communication means can be, for example, well known communication means such as a vehicle information and communication system (VICS (registered trademark)). The communication available hours denote a time period in which each branch station can establish communication with the mobile station. The mobile station can be, for example, a mobile that establishes communication with the branch station. Examples of the mobile include mobile terminals and transportation means. Examples of the mobile terminal include portable terminals such as cellular phones and tablet terminals. Examples of the transportation means include aircrafts such as airplanes and helicopters; vehicles such as trains and automobiles; ships; motorcycles; and bicycles. The mobile station may be equipped with the route calculation device 100 of the present embodiment and a display unit that displays the first travel route calculated by the route calculation device 100 that will be described below, for example, or the mobile station may be equipped only with the display unit. The number of the branch stations is not limited to particular numbers as long as the number of the branch stations is more than one, i.e., two or more, and there is no particular upper limit.

The reference time acquisition unit 12 acquires a reference time. The reference time acquisition unit 12 can be, for example, the communication means. Examples of the reference time include a current time of the mobile station and an arbitrarily departure time at which the mobile station starts traveling.

The road information acquisition unit 13 acquires time information of a road section (hereinafter, also may be referred to as "driving time information"). Examples of the road information acquisition unit 13 include the storage units and the communication means. The road section can be, for example, a road between the mobile station and the branch station and a road between the branch stations. The time information of a road section can be, for example, information such as a travel time from the current location of the mobile station to each branch station and a travel time between the branch stations; and road connection information. The time information of a road section may be information on the travel time with reference to the current time or information on the travel time with reference to an arbitrarily departure time at which the mobile station starts traveling, for example. The road information acquisition unit 13 may acquire current location information of the mobile station, location information of the branch station, distance information of a road section, and speed information of a road section and may calculate and acquire the time information of a road section based on the aforementioned information, for example. The location information of the branch station can be, for example, a communication range of the branch station. The distance information of a road section can be, for example, information on a road distance between the branch stations. The speed information of a road section can be, for example, average speed information such as the average speed of the road between the mobile station and the branch station and the average speed of the road between the branch stations; and speed information such as the legal speed of the road between the mobile station and the branch station and the legal speed of the road between the branch stations.

The route calculation unit 31 calculates the first travel route that offers the shortest required time for stopping by the branch stations based on the communication available hours, the reference time, and the time information of a road section. Examples of the required time include a travel time from the current location of the mobile station to the branch station, a travel time between the branch stations, a time until the communication with the branch station becomes available after the mobile station has arrived at the communication range of the branch station (hereinafter, also referred to as "standby time"), and a communication time between the mobile station and the branch station. The travel route can be, for example, a route with which the mobile station stops by the branch stations. The branch station to be stopped by may be all of or some of the branch stations that establish communication with the mobile station, for example.

Figure 2:
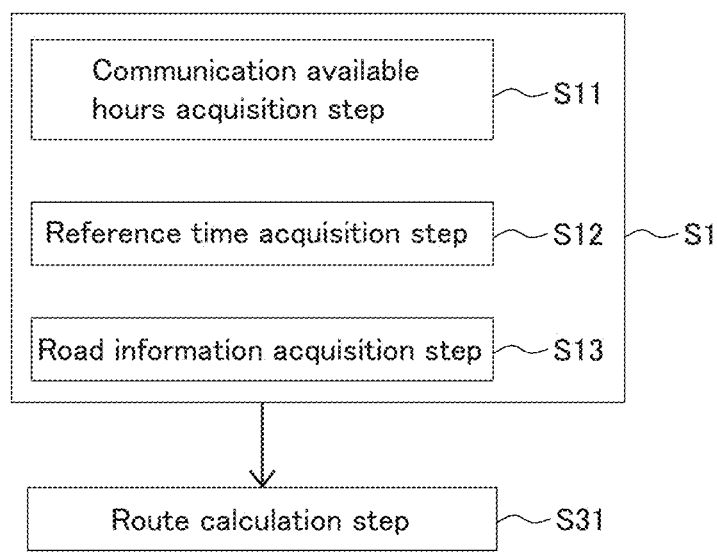
FIG. 2 is a flowchart showing a route calculation method of the first embodiment.

Next, the flowchart of the route calculation method of the present embodiment is described. The route calculation method of the present embodiment is carried out as follows using the route calculation device shown in FIG. 1, for example. As shown in FIG. 2, the route calculation method of the present embodiment includes an information acquisition step (S1) and a route calculation step (S31) as main steps. S1 includes a communication available hours acquisition step (S11), a reference time acquisition step (S12), and a road information acquisition step (S13). In the route calculation method of the present embodiment, it is only required that S1 and S31 are performed in this order, and the order of other steps is by no means limited and not in particular order.

(S11) Communication Available Hours Acquisition Step

In S11, communication available hours of branch stations that establish communication with a mobile station are acquired. When the communication available hours are acquired from the storage unit, for example, the communication available hours stored in the storage unit are retrieved and acquired. When the communication available hours are acquired by the communication means, for example, the communication available hours are acquired via a communication network.

(S12) Reference Time Acquisition Step

In S12, a reference time is acquired.

(S13) Road Information Acquisition Step

In S13, time information of a road section is acquired. When the current location information of a mobile station, the location information of a branch station, the distance information of a road section, and the speed information of a road section are acquired, in S13, the time information of a road section is calculated and acquired based on the distance of each road section and the average speed of the road section, for example.

(S31) Route Calculation Step

In S31, the first travel route that offers the shortest required time for stopping by the branch stations is calculated based on the communication available hours, the reference time, and the time information of a road section. The required time can be calculated, for example, by summing the travel time from the current location of the mobile station to the branch station, the travel time between the branch stations, the standby time, and the communication time between the mobile station and the branch station. Then, for example, by comparing the calculated required times among the travel routes, the travel route that offers the shortest required time is calculated as the first travel route.

In the route calculation device and the route calculation method of the present embodiment, the communication available hours of the branch stations are acquired and the first travel route that offers the shortest required time for stopping by the branch stations is calculated based on the communication available hours, the reference time, and the time information of a road section. Thus, according to the route calculation device and the route calculation method of the present embodiment, a route that allows a user to arrive at a destination or a stop-off point within a determined time period can be calculated. Furthermore, according to the route calculation device and the route calculation method of the present embodiment, for example, because the user can arrive at a destination or a stop-off point within a determined time period, it is possible to improve the work efficiency in the establishment of communication with the branch stations on the route. These effects can be obtained also in the embodiments described below.

(Second Embodiment)

Figure 3:
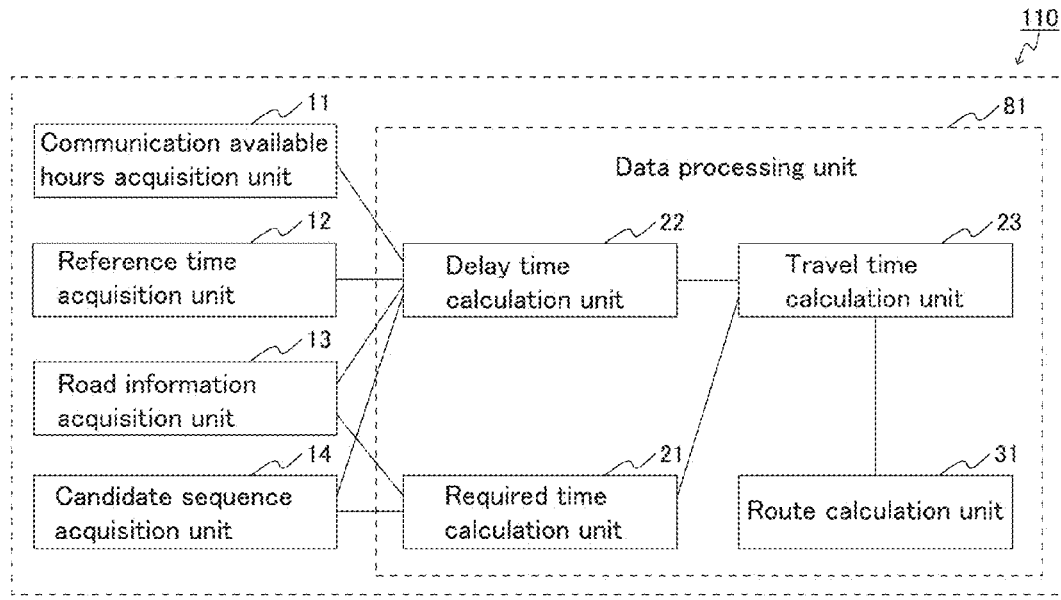
FIG. 3 is a block diagram showing a route calculation device of the second embodiment.

FIG. 3 is a block diagram showing a route calculation device of the present embodiment. As shown in FIG. 3, a route calculation device 110 of the present embodiment includes a candidate sequence acquisition unit 14, a travel time calculation unit 21, a delay time calculation unit 22, and a required time calculation unit 23 in addition to the components of the route calculation device 100 of the first embodiment. As shown in FIG. 3, the travel time calculation unit 21, the delay time calculation unit 22, the required time calculation unit 23, and the route calculation unit 31 may be installed in a data processing unit 81. In the route calculation device 110 of the present embodiment, the travel time calculation unit 21 is electrically connected to the road information acquisition unit 13 and the candidate sequence acquisition unit 14; the delay time calculation unit 22 is electrically connected to the communication available hours acquisition unit 11, the reference time acquisition unit 12, the road information acquisition unit 13, and the candidate sequence acquisition unit 14; the required time calculation unit 23 is electrically connected to the travel time calculation unit 21 and the delay time calculation unit 22; and the route calculation unit 31 is electrically connected to the required time calculation unit 23. In the route calculation device 110 of the present embodiment, the communication available hours acquisition unit 11, the reference time acquisition unit 12, and the road information acquisition unit 13 are the same as the corresponding units of the route calculation device 100 of the first embodiment and the description regarding the corresponding units can be referred to.

The candidate sequence acquisition unit 14 acquires candidate sequences of stopping by the branch stations. Examples of the candidate sequence acquisition unit 14 include the storage units, the communication means, and the data processing units. When the candidate sequence acquisition unit 14 is the data processing unit, the data processing unit 81 may include the candidate sequence acquisition unit 14, for example. When the candidate sequence acquisition unit 14 is the data processing unit, for example, the candidate sequence acquisition unit 14 calculates the travel routes, i.e., routes with each of which the mobile station stops by all the branch stations.

The travel time calculation unit 21 calculates a travel time in a case where the mobile station stops by the branch stations according to each candidate sequence based on the time information of a road section. Examples of the travel time include the travel time from the current location of the mobile station to the branch station and the travel time between the branch stations.

The delay time calculation unit 22 calculates a delay time until communication between the mobile station and each branch station is established after the mobile station has arrived at the branch station with reference to each candidate sequence based on the communication available hours, the reference time, and the time information of a road section. The delay time can be, for example, the standby time. The delay time may further include the communication time between the mobile station and the branch station, for example.

The required time calculation unit 23 calculates a required time with reference to each candidate sequence based on the travel time and the delay time.

The route calculation unit 31 calculates the candidate sequence that offers the shortest required time as the first travel route.

Figure 4:
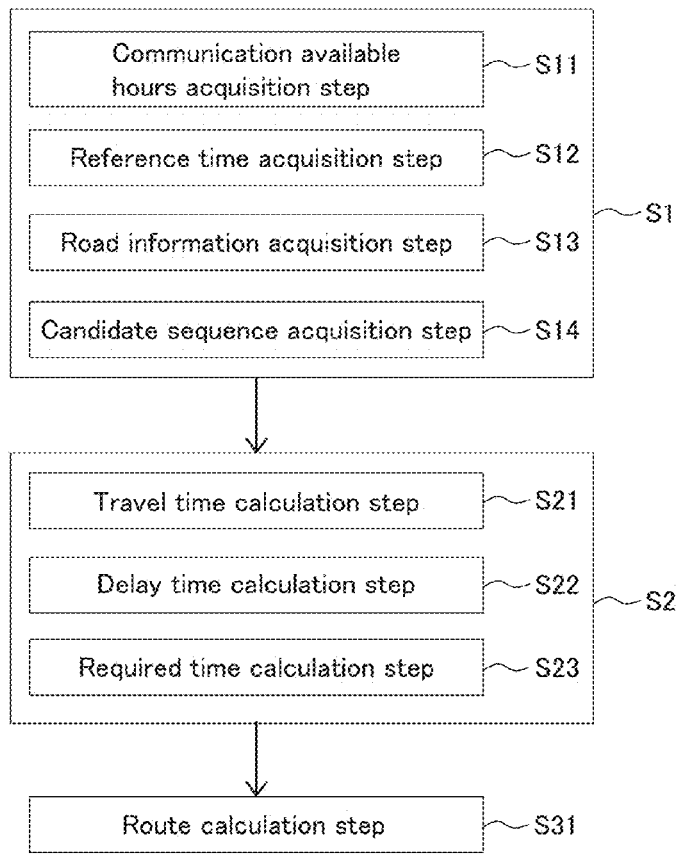
FIG. 4 is a flowchart showing a route calculation method of the second embodiment.

Next, the flowchart of the route calculation method of the present embodiment is described below. The route calculation method of the present embodiment is carried out as follows using the route calculation device shown in FIG. 3, for example. As shown in FIG. 4, the route calculation method of the present embodiment includes an information acquisition step (S1), a time calculation step (S2), and a route calculation step (S31) as main steps. S1 includes a communication available hours acquisition step (S11), a reference time acquisition step (S12), a road information acquisition step (S13), and a candidate sequence acquisition step (S14). S2 includes a travel time calculation step (S21), a delay time calculation step (S22), and a required time calculation step (S23). In the route calculation method of the present embodiment, it is only required that S1, S2, and S31 are performed in this order and S23 is performed after S21 and S22, and the order of other steps is by no means limited and not in particular order. In the route calculation method of the present embodiment, S11, S12, and S13 are the same as the corresponding steps in the route calculation method of the first embodiment, and the description regarding the corresponding steps can be referred to.

First, S11 to S13 are performed in the same manner as in the route calculation method of the first embodiment.

(S14) Candidate Sequence Acquisition Step

Next, in S14, candidate sequences of stopping by the branch stations are acquired. When the candidate sequence is acquired from the storage unit, for example, the candidate sequence stored in the storage unit is retrieved and acquired. When the candidate sequence is acquired by the communication means, for example, the candidate sequence is acquired via a communication network. When the candidate sequence is acquired by the data processing unit, combinations of sequences of stopping by all the branch stations are calculated and acquired as candidate sequences. In S14, for example, all of or a part of the combinations of sequences of stopping by all the branch stations may be acquired.

(S21) Travel Time Calculation Step

In S21, a travel time in a case where the mobile station stops by the branch stations according to each candidate sequence is calculated based on the time information of a road section. The travel time can be calculated, for example, by summing the travel time from the current location of the mobile station to the branch station and the travel time between the branch stations according to each candidate sequence based on the time information of a road section.

(S22) Delay Time Calculation Step

In S22, a delay time until communication between the mobile station and each branch station is established after the mobile station has arrived at the branch station is calculated with reference to each candidate sequence based on the communication available hours, the reference time, and the time information of a road section. For example, the delay time is calculated as described below. On the basis of the time information of a road section, the time required for the mobile station to travel to the branch station is added to the reference time to calculate an arrival time. Next, it is determined whether the arrival time falls within the communication available hours of the branch station. When the arrival time does not fall within the communication available hours of the branch station, the standby time at the branch station shall be the difference between the arrival time and the start time of the earliest communication available hours of the branch station after the mobile station has arrived at the branch station. On the other hand, when the arrival time falls within the communication available hours of the branch station, the standby time at the branch station shall be 0. Furthermore, when the arrival time does not fall within the communication available hours of the branch station, the start time of the communication available hours of the branch station shall be the departure time from the branch station. On the other hand, when the arrival time falls within the communication available hours of the branch station, the arrival time at the branch station shall be the departure time from the branch station. Moreover, by using the departure time of the mobile station from the branch station as a reference in place of the reference time, the standby times at the branch stations following thereafter in the candidate sequence are calculated in the same manner as described above. Then, by summing the standby times, the delay time is calculated. The delay time can be calculated, for example, by the following Expression 1. In Expression 1, "n" denotes the number of the branch stations and "i" denotes the number of the sequence of stopping by the branch station in the candidate sequence.

$$\text{Dilay Time} = \sum_{i=1}^{i=n} Td_{(i)}$$

if $\{Ts_{(i-1)} + Tm_{(i)}\} \notin Tc_{(i)}$ $Td_{(i)} = Tcs_{(i)} - (Ts_{(i-1)} + Tm_{(i)})$ $Ts_{(i)} = Tcs_{(i)}$ if $\{Ts_{(i-1)} + Tm_{(i)}\} \in Tc_{(i)}$ $Td_{(i)} = 0$ $Ts_{(i)} = Ts_{(i-1)} + Tm_{(i)}$ $Tc_{(i)}$: The earliest communication available hours of the branch station whose candidate sequence is the $i^{th}$ after a mobile station has arrived at the branch station or the communication available hours of the branch station including the arrival time of arriving at the branch station $Tcs_{(i)}$: The start time of $Tc_{(i)}$ $Td_{(i)}$: The standby time at the branch station whose candidate sequence is the $i^{th}$ $Tm_{(i)}$: The time required for traveling from the current location to the branch station whose candidate sequence is the first $Tm_{(1)}$: The time required for traveling from the branch station whose candidate sequence is the i-1$^{th}$ to the branch station whose candidate sequence is the ith (i=2 to n)

$Ts_{(i)}$: The current time $Ts_{(i)}$: The departure time of a vehicle from the branch station whose candidate sequence is the $i^{th}$ (S23) Required Time Calculation Step In S23, a required time is calculated with reference to each candidate sequence based on the travel time and the delay time. The required time can be calculated, for example, by adding the travel time and the delay time.

(S31) Route Calculation Step

In S31, the candidate sequence that offers the shortest required time is calculated as the first travel route.

In the route calculation device and the route calculation method of the present embodiment, the travel time and the delay time are calculated based on the communication available hours, the reference time, and the time information of a road section, and the required time is calculated by adding the travel time and the delay time. In the route calculation device and the route calculation method of the present embodiment, the delay time until communication between the mobile station and the branch station is established after the mobile station has arrived at the branch station is taken into consideration. Thus, the route that allows a user to arrive at a destination or a stop-off point within a determined time period can be calculated with higher accuracy. Furthermore, according to the route calculation device and the route calculation method of the present embodiment, for example, because the user can arrive at a destination or a stop-off point within a determined time period, it is possible to improve the work efficiency in the establishment of communication with the branch stations on the route.

(Third Embodiment)

Figure 5:
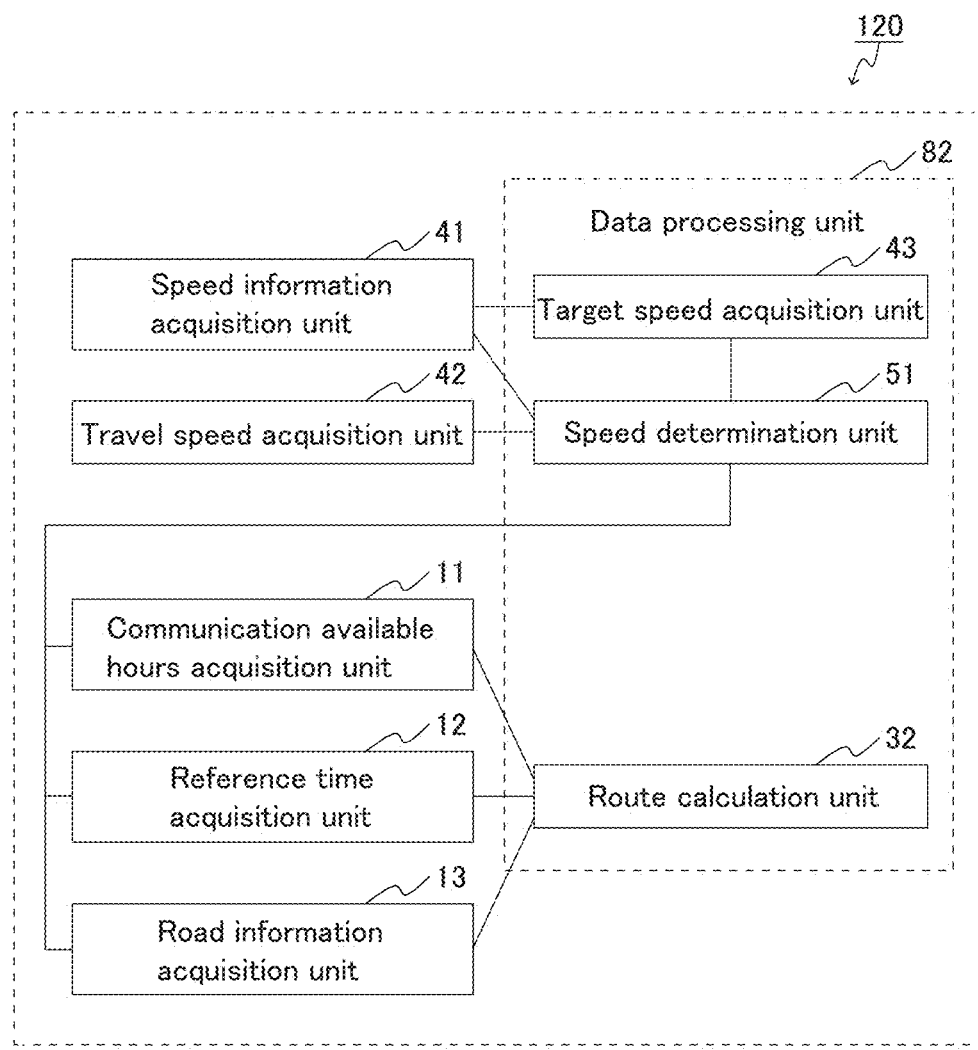
FIG. 5 is a block diagram showing a route calculation device of the third embodiment.

FIG. 5 is a block diagram showing a route calculation device of the present embodiment. As shown in FIG. 5, a route calculation device 120 of the present embodiment includes a speed information acquisition unit 41, a travel speed acquisition unit 42, a target speed acquisition unit 43, and a speed determination unit 51 in addition to the components of the route calculation device of the first embodiment. As shown in FIG. 5, the target speed acquisition unit 43, the speed determination unit 51, and the route calculation unit 32 may be installed in a data processing unit 82. In the route calculation device 120 of the present embodiment, the target speed acquisition unit 43 is electrically connected to the speed information acquisition unit 41; the speed determination unit 51 is electrically connected to the speed information acquisition unit 41, the travel speed acquisition unit 42, and the target speed acquisition unit 43; and the communication available hours acquisition unit 11, the reference time acquisition unit 12, and the road information acquisition unit 13 are electrically connected to the speed determination unit 51. In the route calculation device 120 of the present embodiment, the communication available hours acquisition unit 11, the reference time acquisition unit 12, and the road information acquisition unit 13 acquire the communication available hours, the reference time, and the time information of a road section, respectively, when it is determined that the difference between the target speed and the travel speed is out of a predetermined range by the speed determination unit 51. Furthermore, the route calculation unit 32 calculates a route that offers the shortest required time as the second route. Except for these points, the route calculation device 120 of the present embodiment is the same as the route calculation device 100 of the first embodiment, and the description regarding the route calculation device 100 of the first embodiment can be referred to.

The speed information acquisition unit 41 acquires the speed information of a road section. Examples of the speed information unit 41 include the storage units and the communication means.

The travel speed acquisition unit 42 acquires a travel speed. The travel speed acquisition unit 42 can be, for example, the communication means. When the mobile station is equipped with the route calculation device of the present embodiment, the travel speed acquisition unit 42 may be a speedometer that measures the speed of the mobile station, for example. The travel speed can be, for example, the speed of the mobile station.

The target speed acquisition unit 43 acquires a target speed based on the first travel route and the speed information of a road section. The first travel route can be, for example, the travel route that has already been calculated by the route calculation device of the present embodiment. The target speed can be, for example, the average speed of a road, the legal speed of a road, and the like in the road section in which the mobile station is traveling on the first travel route.

The speed determination unit 51 determines whether the difference between the target speed and the travel speed is out of a predetermined range. The predetermined range is not particularly limited, and can be determined appropriately according to the legal speed of a road in the road section in which the mobile station is traveling, for example.

Figure 6:
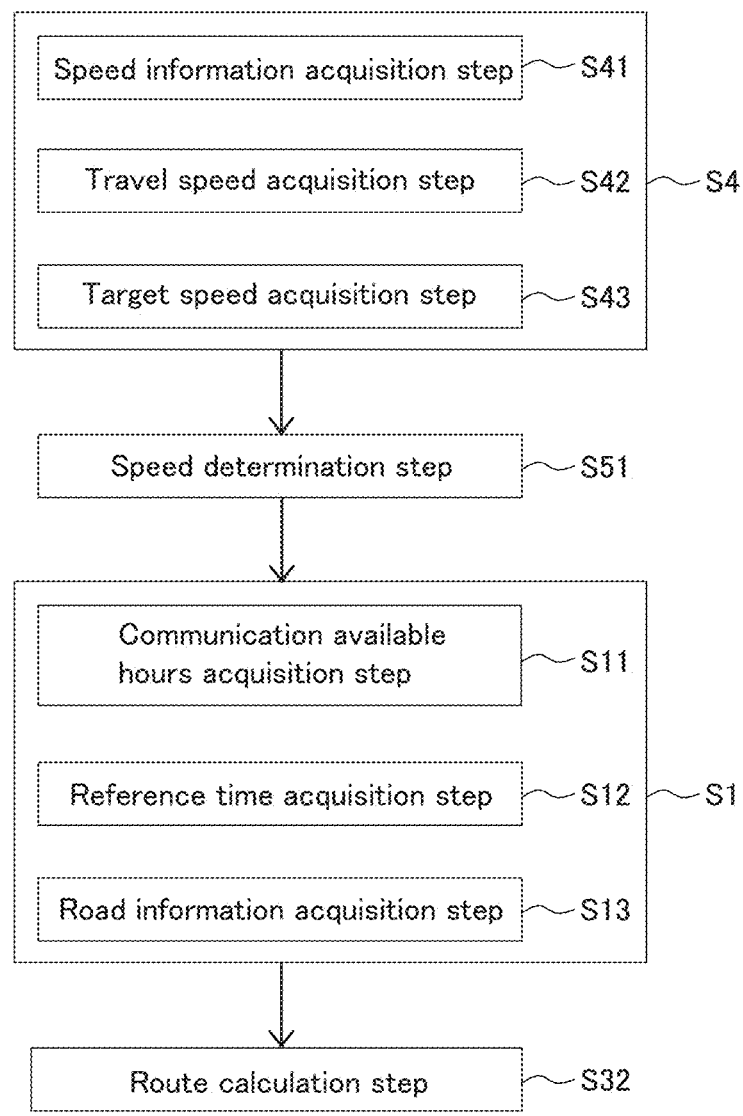
FIG. 6 is a flowchart showing a route calculation method of the third embodiment.

Next, the flowchart of the route calculation method of the present embodiment is described below. The route calculation method of the present embodiment is carried out as follows using the route calculation device shown in FIG. 5, for example. As shown in FIG. 6, the route calculation method of the present embodiment includes an additional information acquisition step (S4) and a speed determination step (S51) as main steps in addition to the steps of the route calculation method of the first embodiment. S4 includes a speed information acquisition step (S41), a travel speed acquisition step (S42), and a target speed acquisition step (S43). In the route calculation method of the present embodiment, it is only required that S4, S51, S1, and S32 are performed in this order and S43 is performed after S41 and S42, and the order of other steps is by no means limited and not in particular order. In the route calculation method of the present embodiment, S11 to S13 and S32 are performed when it is determined that the difference between the target speed and the travel speed is out of a predetermined range in S51. S32 calculates a route that offers the shortest required time as the second route. Except for these points, the route calculation method of the present embodiment is the same as the route calculation method of the first embodiment, and the description regarding the route calculation method of the first embodiment can be referred to.

(S41) Speed Information Acquisition Step

In S41, speed information of a road section is acquired. When the speed information of a road section is acquired from the storage unit, for example, the speed information of a road section stored in the storage unit is retrieved and acquired. When the speed information of a road section is acquired by the communication means, for example, the speed information of a road section is acquired via a communication network. In the calculation of the first travel route, when the road information acquisition unit has acquired the speed information of a road section, the speed information of a road section which has been acquired by the road information acquisition unit may be acquired.

(S42) Travel Speed Acquisition Step

In S42, a travel speed is acquired.

(S43) Target Speed Acquisition Step

In S43, a target speed is acquired based on the first travel route and the speed information of a road section. As the target speed, the speed information of a road section corresponding to the road on which the mobile station is traveling on the first travel route is acquired, for example.

(S51) Speed Determination Step

In S51, it is determined whether the difference between the target speed and the travel speed is within a predetermined range. When the difference is within the predetermined range, for example, the step returns to S41 or does not advance to S1. In contrast, when the difference is out of the predetermined range, the step advances to S1.

Furthermore, in S51, when it is determined that the difference between the target speed and the travel speed is out of a predetermined range, S11 to S13 and S32 are performed in the same manner as in the route calculation method of the first embodiment, thereby calculating the second travel route.

In the route calculation device and the route calculation method of the present embodiment, when the difference between the target speed and the travel speed is out of a predetermined range, the second travel route that offers the shortest required time for stopping by the branch stations is calculated. In the route calculation device and the route calculation method of the present embodiment, the difference between the target speed and the travel speed is taken into consideration. Thus, for example, even in a case where a user cannot arrive at a destination or a stop-off point on the first travel route within a determined time period, the user can stop by the branch stations with the shortest required time by traveling on the second travel route. Therefore, according to the route calculation device and the route calculation method of the present embodiment, for example, it is possible to improve the work efficiency in the establishment of communication with the branch stations on the route.

Preferably, the route calculation device 120 of the present embodiment further includes:
a candidate sequence acquisition unit that acquires a plurality of candidate sequences of stopping by the branch stations; a travel time calculation unit that calculates a travel time in a case where the mobile station stops by the branch stations according to each candidate sequence based on the time information of a road section; a delay time calculation unit that calculates a delay time until communication between the mobile station and each branch station is established after the mobile station has arrived at the branch station with reference to each candidate sequence based on the communication available hours, the reference time, and the time information of a road section; and a required time calculation unit that calculates a required time with reference to each candidate sequence based on the travel time and the delay time, wherein the route calculation unit calculates the candidate sequence that offers the shortest required time as the second travel route. With reference to the route calculation device including the candidate sequence acquisition unit, the travel time calculation unit, the delay time calculation unit, and the required time calculation unit, for example, the description regarding the route calculation device of the second embodiment can be referred to.

Preferably, the route calculation method of the present embodiment further includes the following steps: acquiring a plurality of candidate sequences of stopping by the branch stations; calculating a travel time in a case where the mobile station stops by the branch stations according to each candidate sequence based on the time information of a road section; calculating a delay time until communication between the mobile station and each branch station is established after the mobile station has arrived at the branch station with reference to each candidate sequence based on the communication available hours, the reference time, and the time information of a road section; and calculating a required time with reference to each candidate sequence based on the travel time and the delay time, wherein the route calculation unit calculates the candidate sequence that offers the shortest required time as the second travel route. With reference to the route calculation method including the candidate sequence acquisition step, the travel time calculation step, the delay time calculation step, and the required time calculation step, for example, the description regarding the route calculation method of the second embodiment can be referred to.

(Fourth Embodiment)

Figure 7:
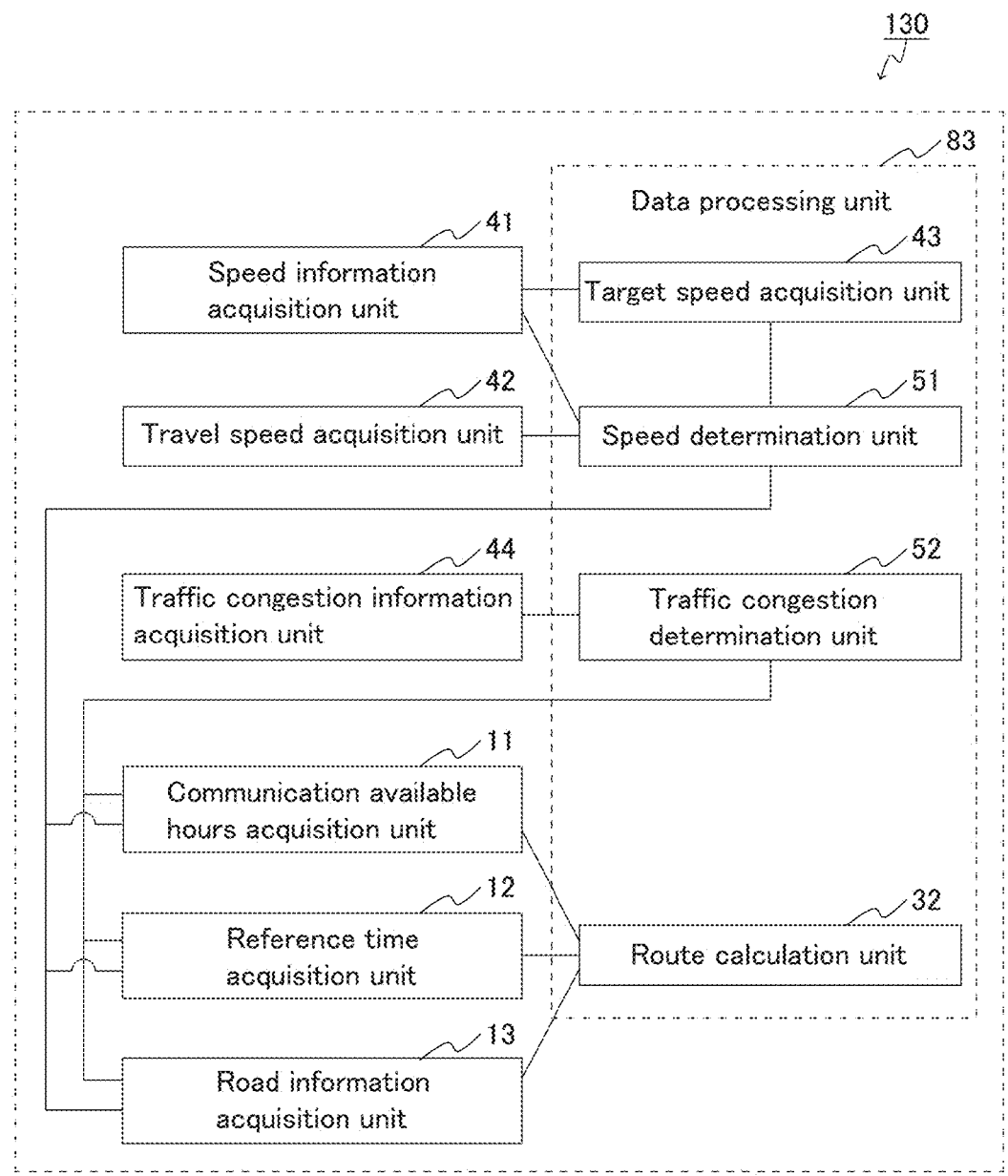
FIG. 7 is a block diagram showing a route calculation device of the fourth embodiment.

FIG. 7 is a block diagram showing a route calculation device of the present embodiment. As shown in FIG. 7, a route calculation device 130 of the present embodiment includes a traffic congestion information acquisition unit 44 and a traffic congestion determination unit 52 in addition to the components of the route calculation device of the third embodiment. As shown in FIG. 7, the target speed acquisition unit 43, the speed determination unit 51, the traffic congestion determination unit 52, and the route calculation unit 32 may be installed in a data processing unit 83. In the route calculation device 130 of the present embodiment, the traffic congestion determination unit 52 is electrically connected to the traffic congestion information acquisition unit 44; and the communication available hours acquisition unit 11, the reference time acquisition unit 12, and the road information acquisition unit 13 are electrically connected to the speed determination unit 51 and the traffic congestion determination unit 52. In the route calculation device 130 of the present embodiment, the communication available hours acquisition unit 11, the reference time acquisition unit 12, and the road information acquisition unit 13 acquire the communication available hours, the reference time, and the time information of a road section, respectively, when it is determined that the difference between the target speed and the travel speed is out of a predetermined range by the speed determination unit 51 and that there is traffic congestion on the first travel route by the traffic congestion determination unit 52. Except for these points, the route calculation device 130 of the present embodiment is the same as the route calculation device 120 of the third embodiment, and the description regarding the route calculation device 120 of the third embodiment can be referred to.

The traffic congestion information acquisition unit 44 acquires the information on the location of traffic congestion. The traffic congestion information acquisition unit 44 can be, for example, the communication means. The location of traffic congestion may only be the location of traffic congestion on the first travel route or the location of traffic congestion including the location of traffic congestion on the first travel route, for example. The latter includes the location of traffic congestion on the first travel route and other locations of traffic congestion, for example. The other locations of traffic congestion can be the location of traffic congestion that is not on the first travel route.

The traffic congestion determination unit 52 determines whether there is traffic congestion on the first travel route based on the first travel route and the information on the location of traffic congestion.

Figure 8:
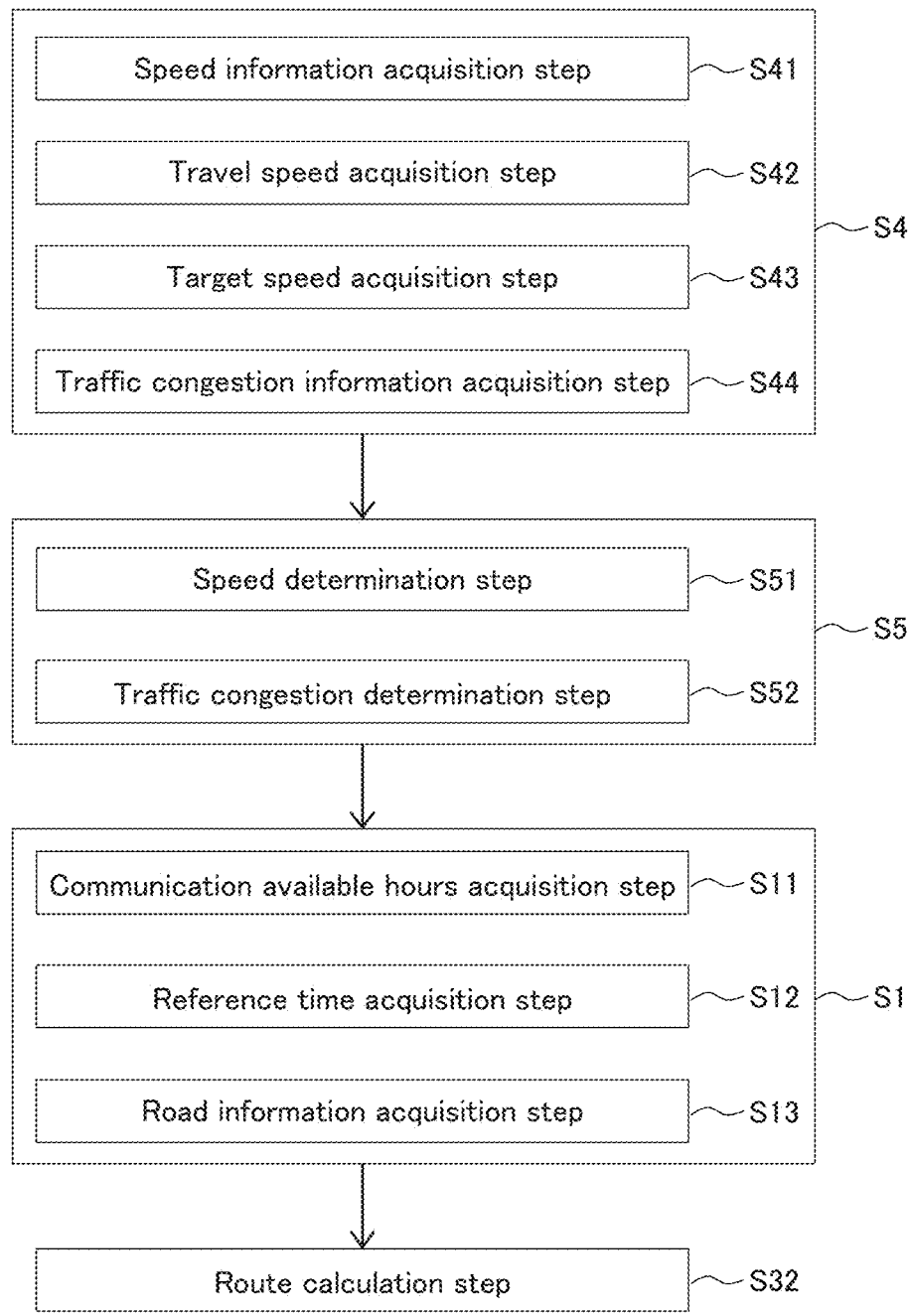
FIG. 8 is a flowchart showing a route calculation method of the fourth embodiment.

Next, the flowchart of the route calculation method of the present embodiment is described below. The route calculation method of the present embodiment is carried out as follows using the route calculation device shown in FIG. 7, for example. As shown in FIG. 8, the route calculation method of the present embodiment includes a traffic congestion information acquisition step (S44) and a traffic congestion determination step (S52) in addition to the steps of the route calculation method of the third embodiment. In the route calculation method of the present embodiment, a determination step (S5) includes S51 and S52. In the route calculation method of the present embodiment, it is only required that S1 and S32 are performed after S4 and S5, S43 is performed after S41 and S42, S51 is performed after S43, and S52 is performed after S44, and the order of other steps is by no means limited and not in particular order. In the route calculation method of the present embodiment, S11 to S13 are performed when it is determined that the difference between the target speed and the travel speed is out of a predetermined range in S51 and that there is traffic congestion on the first travel route in S52. Except for these points, the route calculation method of the present embodiment is the same as the route calculation method of the third embodiment, and the description regarding the route calculation method of the third embodiment can be referred to.

First, S41 to S43 are performed in the same manner as in the route calculation method of the third embodiment.

(S44) Traffic Congestion Information Acquisition Step

In S44, information on the location of traffic congestion is acquired.

Next, S51 is performed in the same manner as in the route calculation method of the third embodiment.

(S52) Traffic Congestion Determination Step

In S52, it is determined whether there is traffic congestion on the first travel route based on the first travel route and the information on the location of traffic congestion. When there is no traffic congestion on the first travel route, the step returns to S41 or does not advance to S1. In contrast, when there is traffic congestion on the first travel route, the step advances to S1.

Furthermore, when it is determined that the difference between the target speed and the travel speed is out of a predetermined range in S51 and that there is traffic congestion on the first travel route in S52, S11 to S13 and S32 are performed in the same manner as in the route calculation method of the third embodiment, thereby calculating the second travel route.

In the route calculation device and the route calculation method of the present embodiment, the information on the location of traffic congestion is also taken into consideration. Thus, when it is determined that the difference between the target speed and the travel speed is out of a predetermined range, it can be determined whether the difference is unavoidable difference due to the traffic congestion, for example. Furthermore, for example, even in a case where a user cannot arrive at a destination or a stop-off point on the first travel route within a determined time period due to the traffic congestion, the user can stop by the branch stations with the shortest required time by traveling on the second travel route. Therefore, according to the route calculation device and the route calculation method of the present embodiment, for example, it is possible to improve the work efficiency in the establishment of communication with the branch stations on the route.

(Fifth Embodiment)

Figure 9:
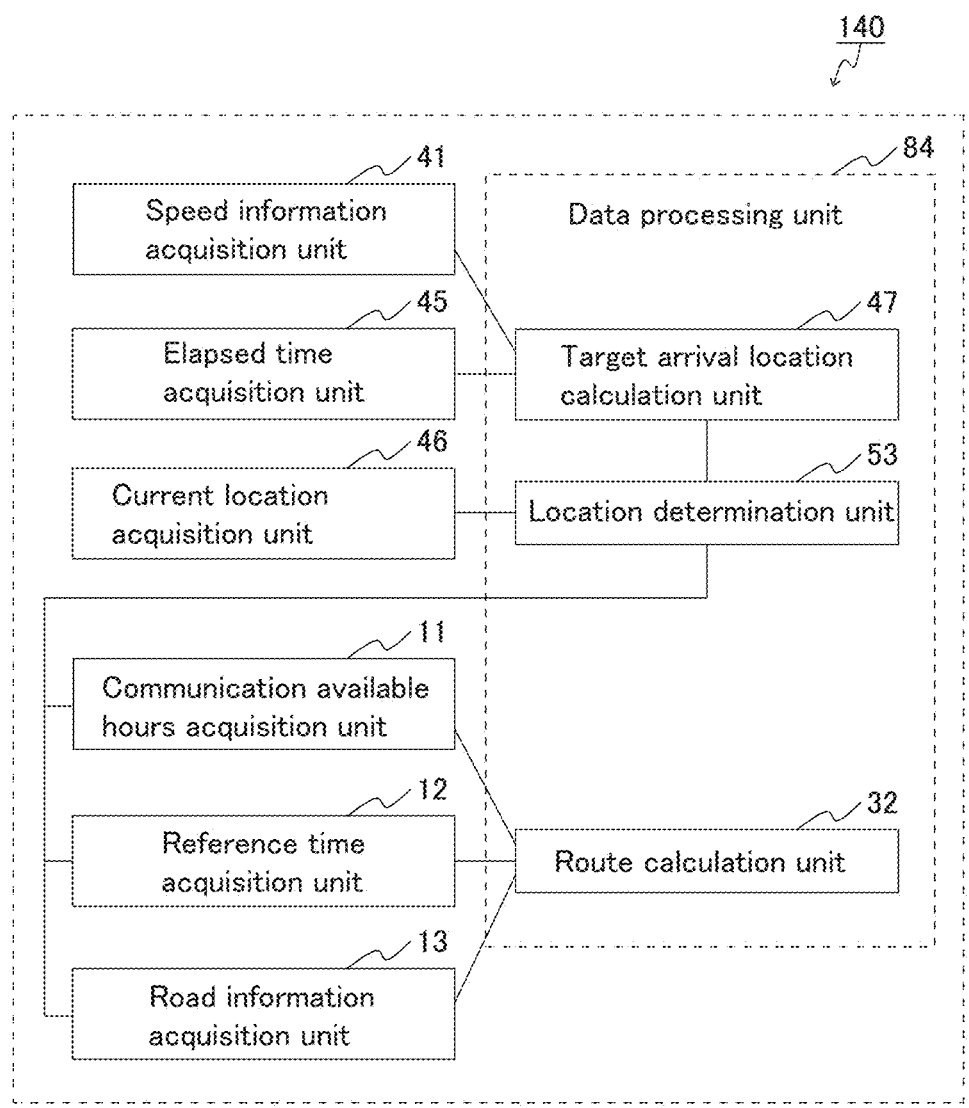
FIG. 9 is a block diagram showing a route calculation device of the fifth embodiment.

FIG. 9 is a block diagram showing a route calculation device of the present embodiment. As shown in FIG. 9, a route calculation device 140 of the present embodiment includes a speed information acquisition unit 41, an elapsed time acquisition unit 45, a current location acquisition unit 46, a target arrival location calculation unit 47, and a location determination unit 53 in addition to the components of the route calculation device of the first embodiment. As shown in FIG. 9, the target arrival location calculation unit 47, the location determination unit 53, and the route calculation unit 32 may be installed in a data processing unit 84. In the route calculation device 140 of the present embodiment, the target arrival location calculation unit 47 is electrically connected to the speed information acquisition unit 41 and the elapsed time acquisition unit 45; the location determination unit 53 is electrically connected to the current location acquisition unit 46 and the target arrival location calculation unit 47; and the communication available hours acquisition unit 11, the reference time acquisition unit 12, and the road information acquisition unit 13 are electrically connected to the location determination unit 53. In the route calculation device 140 of the present embodiment, the communication available hours acquisition unit 11, the reference time acquisition unit 12, and the road information acquisition unit 13 acquire the communication available hours, the reference time, and the time information of a road section, respectively, when it is determined that the locational difference between the target arrival location and the current location is out of a predetermined range by the location determination unit 52. Furthermore, the route calculation unit 32 calculates a route that offers the shortest required time as the second route. Except for these points, the route calculation device 140 of the present embodiment is the same as the route calculation device 100 of the first embodiment, and the description regarding the route calculation device 100 of the first embodiment can be referred to.

The elapsed time acquisition unit 45 acquires an elapsed time after the mobile station has started to travel. Examples of the elapsed time acquisition unit 45 include well known time measurement units such as timers and stopwatches. The elapsed time after the mobile station has started to travel can be, for example, a time elapsed from the time when the mobile station starts traveling. The elapsed time may be a time obtained by measuring a time required for the mobile station to pass through each road section, for example.

The current location acquisition unit 46 acquires a current location. The current location acquisition unit 46 can be, for example, a well known positioning unit such as a global positioning system (GPS). The current location can be, for example, the current location of the mobile station.

The target arrival location calculation unit 47 calculates a target arrival location based on the speed information of a road section and the elapsed time. The target arrival location can be, for example, a mathematically predictable location of the mobile station at the elapsed time.

The location determination unit 53 determines whether the difference between the target arrival location and the current location is out of a predetermined range. The predetermined range is not particularly limited, and can be determined appropriately according to the legal speed of a road or the like in the road section in which the mobile station is traveling, for example.

Figure 10:
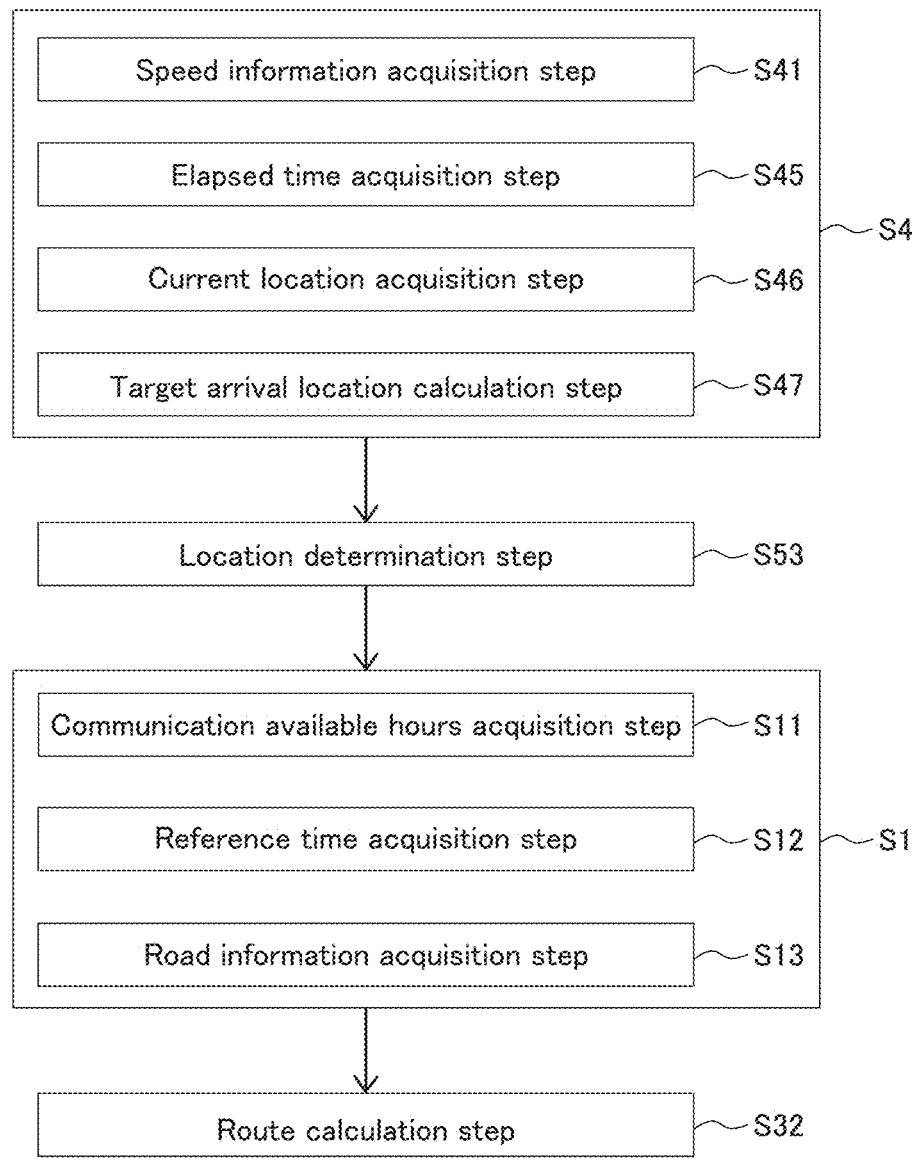
FIG. 10 is a flowchart showing a route calculation method of the fifth embodiment.

Next, the flowchart of the route calculation method of the present embodiment is described below. The route calculation method of the present embodiment is carried out as follows using the route calculation device shown in FIG. 9, for example. As shown in FIG. 10, the route calculation method of the present embodiment includes an additional information acquisition step (S4) and a location determination step (S53) as main steps in addition to the steps of the route calculation method of the first embodiment. S4 includes a speed information acquisition step (S41), an elapsed time acquisition step (S45), a current location acquisition step (S46), and a target arrival location calculation step (S47). In the route calculation method of the present embodiment, it is only required that S4, S53, S1, and S32 are performed in this order and S47 is performed after S41 and S45, and the order of other steps is by no means limited and not in particular order. In the route calculation method of the present embodiment, S11 to S13 and S32 are performed when it is determined that the difference between the target arrival location and the current location is out of a predetermined range in S53. Furthermore, S32 calculates a route that offers the shortest required time as the second route. Except for these points, the route calculation method of the present embodiment is the same as the route calculation method of the first embodiment, and the description regarding the route calculation method of the first embodiment can be referred to.

First, S41 is performed in the same manner as in the route calculation method of the third embodiment.

(S45) Elapsed Time Acquisition Step

In S45, an elapsed time after the mobile station has started to travel is acquired.

(S46) Current Location Acquisition Step

In S46, a current location is acquired.

(S47) Target Arrival Location Calculation Step

In S47, a target arrival location is calculated based on the speed information of a road section and the elapsed time. The target arrival location can be calculated by adding a distance calculated based on the average speed of each road section acquired from the speed information of the road section and the elapsed time of each road section to the current location at the time of calculating the first travel route, for example.

(S53) Location Determination Step

In S53, it is determined whether the locational difference between the target arrival location and the current location is out of a predetermined range. When the locational difference is within the predetermined range, for example, the step returns to S41 or does not advance to S1. In contrast, when the locational difference is out of the predetermined range, the step advances to S1.

Furthermore, in S53, when it is determined that the locational difference between the target arrival location and the current location is out of a predetermined range, S11 to S13 and S32 are performed in the same manner as in the route calculation method of the first embodiment, thereby calculating the second travel route.

In the route calculation device and the route calculation method of the present embodiment, when the locational difference between the target arrival location and the current location is out of a predetermined range, the second travel route that offers the shortest required time for stopping by the branch stations is calculated. In the route calculation device and the route calculation method of the present embodiment, the locational difference between the target arrival location and the current location is taken into consideration. Thus, for example, even in a case where a user cannot arrive at a destination or a stop-off point on the first travel route within a determined time period, the user can stop by the branch stations with the shortest required time by traveling on the second travel route. Therefore, according to the route calculation device and the route calculation method of the present embodiment, for example, it is possible to improve the work efficiency in the establishment of communication with the branch stations on the route.

Preferably, the route calculation device 140 of the present embodiment further includes: a traffic congestion information acquisition unit that acquires information on a location of traffic congestion; and a traffic congestion determination unit that determines whether there is traffic congestion on the first travel route based on the first travel route and the information on a location of traffic congestion, wherein when it is determined that the locational difference between the target arrival location and the current location is out of a predetermined range and that there is traffic congestion on the first travel route, the route calculation unit calculates the second travel route that offers the shortest required time for stopping by the branch stations. With reference to the route calculation device including the traffic congestion information acquisition unit and the traffic congestion determination unit, for example, the description regarding the route calculation device of the fourth embodiment can be referred to.

Preferably, the route calculation method of the present embodiment further includes the following steps: acquiring information on a location of traffic congestion; and determining whether there is traffic congestion on the first travel route based on the first travel route and the information on the location of traffic congestion, wherein when it is determined that the locational difference between the target arrival location and the current location is out of a predetermined range and that there is traffic congestion on the first travel route, the second travel route that offers the shortest required time for stopping by the branch stations is calculated in the route calculation step. With reference to the route calculation method including the traffic congestion information acquisition step and the traffic congestion determination step, for example, the description regarding the route calculation method of the fourth embodiment can be referred to.

(Sixth Embodiment)

Figure 11:
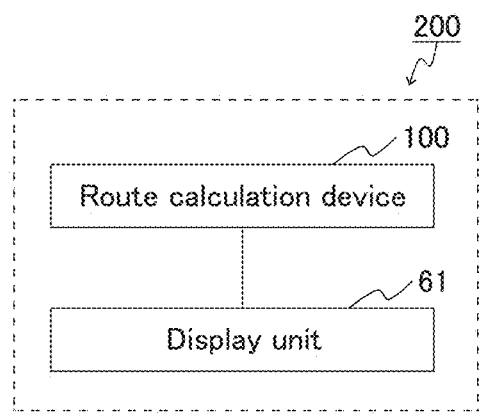
FIG. 11 is a block diagram showing a route calculation device of the sixth embodiment.

FIG. 11 is a block diagram showing a navigation device of the present embodiment.

As shown in FIG. 11, a navigation device 200 of the present embodiment includes a route calculation device 100 and a display unit 61. In the navigation device 200 of the present embodiment, the route calculation device 100 is electrically connected to the display unit 61. The route calculation device 100 of the present embodiment is the same as the route calculation device 100 of the first embodiment and the description regarding the route calculation device 100 of the first embodiment can be referred to. Although the route calculation device includes the route calculation device 100 of the first embodiment in the present embodiment, it may include any of the route calculation devices of the second to fifth embodiments or a route calculation device configured by combining the route calculation devices of the second to fifth embodiments.

The display unit 61 displays the first travel route calculated by the route calculation device. The display unit is not particularly limited, and examples thereof include various image displays such as liquid crystal displays (LCDs) and cathode-ray tube (CRT) displays.

Figure 12:
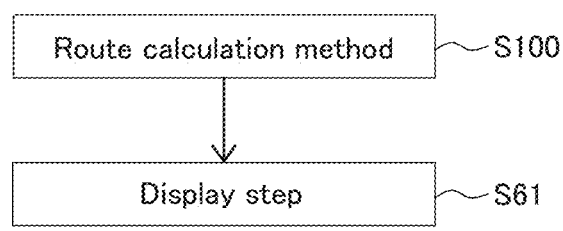
FIG. 12 is a flowchart showing a route calculation method of the sixth embodiment.

Next, the flowchart of the navigation method of the present embodiment is described below. The navigation method of the present embodiment is carried out as follows using the route calculation device shown in FIG. 11, for example. As shown in FIG. 12, the navigation method of the present embodiment includes the route calculation method of the first embodiment (S100) and a display step (S61). In the navigation method of the present embodiment, it is only required that S100 and S61 are performed in this order. S100 is the same as the route calculation method of the first embodiment and the description regarding the route calculation method of the first embodiment can be referred to. Although the route calculation method includes the route calculation method 100 of the first embodiment in the present embodiment, it may include any of the route calculation methods of the second to fifth embodiments or a route calculation method obtained by combining the methods of the second to fifth embodiments.

In the navigation device and the navigation method of the present embodiment, the communication available hours of the branch stations are obtained by the route calculation device and the route calculation method, and the first travel route that offers the shortest required time for stopping by the branch stations is calculated based on the communication available hours, the reference time, and the time information of a road section. Thus, according to the navigation device and the navigation method of the present embodiment, the route that allows a user to arrive at a destination or a stop-off point within a determined time period can be displayed. Furthermore, according to the navigation device and the navigation method of the present embodiment, for example, because the user can arrive at a destination or a stop-off point within a determined time period, it is possible to improve the work efficiency in the establishment of communication with the branch stations on the route. These effects can be obtained also in the embodiments described below.

In the navigation device of the present embodiment, preferably, the display unit displays a warning when the speed determination unit of the route calculation device determines that the difference between the target speed and the travel speed acquired by the route calculation device is out of a predetermined range. Furthermore, in the navigation method of the present embodiment, preferably, a warning is displayed in the display step when it is determined that the difference between the target speed and the travel speed acquired by the route calculation device is out of a predetermined range in the speed determination step of the route calculation method. By displaying a warning, it is possible to notify the operator of the navigation device that the arrival at the next branch station will be too early or too late, for example. These effects can be obtained also in the preferable embodiments described below.

Preferably, the navigation device of the present embodiment further includes a travel route determination unit that determines whether the second travel route is different from the first travel route, wherein when the travel route determination unit determines that the second travel route calculated by the route calculation device is different from the first travel route, the display unit displays the second travel route calculated by the route calculation device and a notice that a travel route has changed. Furthermore, preferably, the navigation method of the present embodiment further includes the following steps: determining whether the second travel route is different from the first travel route, wherein when it is determined that the second travel route calculated by the route calculation method is different from the first travel route in the travel route determination step, the second travel route calculated by the route calculation method and a notice that a travel route has changed are displayed in the display step. By displaying a notice that a travel route has changed, the operator of the navigation device can always check an optimal route, for example. These effects can be obtained also in the preferable embodiments described below.

In the navigation device of the present embodiment, preferably, the display unit displays a warning when the speed determination unit of the route calculation device determines that the difference between the target speed and the travel speed acquired by the route calculation device is out of a predetermined range and the traffic congestion determination unit of the route calculation device determines that there is no traffic congestion on the first travel route. Furthermore, in the navigation method of the present embodiment, preferably, a warning is displayed in the display step when it is determined that the difference between the target speed and the travel speed acquired by the route calculation method is out of a predetermined range in the speed determination step of the route calculation method and that there is no traffic congestion on the first travel route in the traffic congestion determination step of the route calculation method.

In the navigation device of the present embodiment, preferably, the display unit displays a warning when the location determination unit of the route calculation device determines that the locational difference between the target arrival location and the current location acquired by the route calculation device is out of a predetermined range. Furthermore, in the navigation method of the present embodiment, preferably, a warning is displayed in the display step when it is determined that the locational difference between the target arrival location and the current location acquired by the route calculation method is out of a predetermined range in the location determination step of the route calculation method.

In the navigation device of the present embodiment, preferably, the display unit displays a warning when the location determination unit of the route calculation device determines that the locational difference between the target arrival location and the current location acquired by the route calculation device is out of a predetermined range and the traffic congestion determination unit of the route calculation device determines that there is no traffic congestion on the first travel route. Furthermore, in the navigation method of the present embodiment, preferably, a warning is displayed in the display step when it is determined that the locational difference between the target arrival location and the current location acquired by the route calculation method is out of a predetermined range in the location determination step of the route calculation method and that there is no traffic congestion on the first travel route in the traffic congestion determination step of the route calculation method.

In the navigation device of the present embodiment, preferably, the display unit additionally displays the target speed acquired by the route calculation device. Furthermore, in the navigation method of the present embodiment, preferably, the target speed acquired by the route calculation device is additionally displayed in the display step. By displaying the target speed, the operator of the navigation device can always check an optimal speed. These effects can be obtained also in the preferable embodiments described below.

In the navigation device of the present embodiment, preferably, the route calculation unit of the route calculation device calculates an estimated arrival time of arriving at the next branch station to be stopped by based on the reference time, the first travel route, and the time information of a road section acquired by the route calculation device, and the display unit displays the estimated arrival time. Furthermore, in the navigation method of the present embodiment, preferably, an estimated arrival time of arriving at the next branch station to be stopped by is calculated based on the reference time, the first travel route, and the time information of a road section acquired by the route calculation method, and the estimated arrival time is displayed in the display step.

Preferably, the navigation device of the present embodiment further includes a communication range acquisition unit that acquires the communication range of the branch station, wherein the display unit displays the communication range of the branch station. In the navigation device of the present embodiment, preferably, the display unit displays the branch stations, and more preferably, the display unit displays the branch stations with which communication has not been completed out of the branch stations. The communication range acquisition unit can be, for example, the communication means.

Preferably, the navigation method of the present embodiment further includes following step: acquiring a communication range of the branch station, wherein the communication range of the branch station is displayed in the display step. In the navigation method of the present embodiment, preferably, the branch stations are displayed in the display step, and more preferably, the branch stations with which communication has not been completed out of the branch stations are displayed in the display step.

Preferably, in the navigation device of the present embodiment, the display unit displays the number of branch stations with which communication has not been completed out of the branch stations. Furthermore, in the navigation method of the present embodiment, preferably, the number of branch stations with which communication has not been completed out of the branch stations is displayed in the display step.

(Seventh Embodiment)

The seventh embodiment discloses a configuration that uses a navigation device for establishing communication with a signal which is a branch station.

Figure 13:
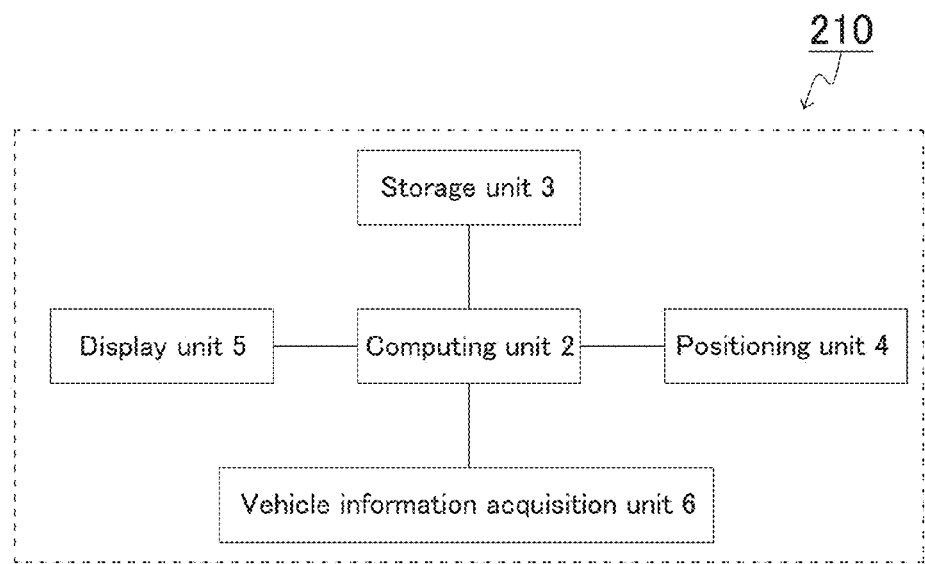
FIG. 13 is a block diagram showing a navigation device of the seventh embodiment.

The seventh embodiment of the present invention regarding the navigation device is described in detail with reference to FIGS. 13 to 17. FIG. 13 is a block diagram showing a navigation device of the seventh embodiment. A navigation device 210 of the present embodiment includes a computing unit 2, a storage unit 3, a positioning unit 4, a display unit 5, and a vehicle information acquisition unit 6. In the navigation device 210 of the present embodiment, the computing unit 2 is electrically connected to the storage unit 3, the positioning unit 4, the display unit 5, and the vehicle information acquisition unit 6.

In the present embodiment, a vehicle is equipped with the navigation device 210, and the navigation device 210 is physically connected to the vehicle. Although the navigation device 210 is physically connected to the vehicle in the present embodiment, the present invention may have a configuration in which the navigation device 210 is not physically connected such as a portable terminal.

In the present embodiment, signal information (the number of target signals to be communicated, location information of a signal, a communication area (communication range) of a signal, communication hours of a signal, etc.), which is branch station information; a candidate sequence which is a sequence of stopping by a communication range (hereinafter, also referred to as a "communication area") of a signal; and road information (a road map, a passing time of a road section, driving time information based on the passing time of a road section, connection information for each road section, an average speed of a road section, distance information of a road section, etc.) are stored in the storage unit 3.

The positioning unit 4 acquires the location information of the navigation device 210, i.e., the global positioning system (GPS) information including the location information of the vehicle, a current time, and the like from a GPS satellite. The GPS information thus obtained is sent to the computing unit 2.

Figure 14:
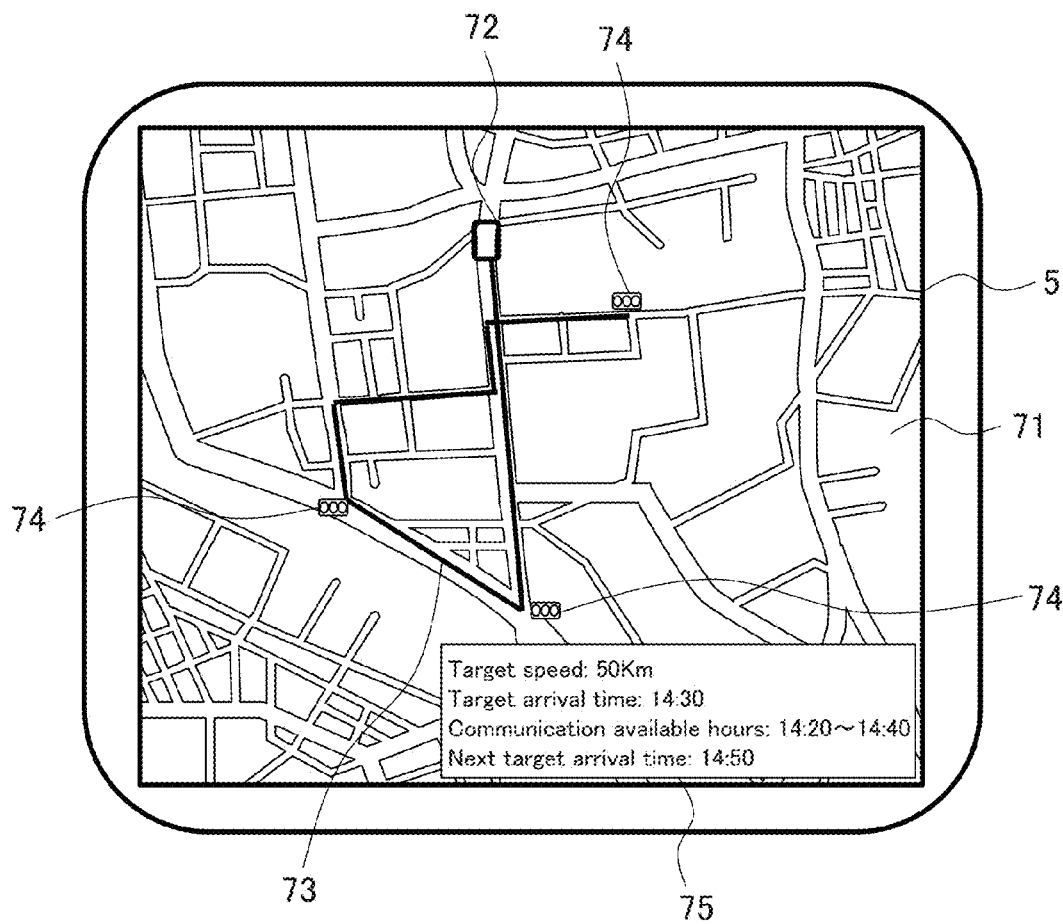
FIG. 14 is a view showing an interface of a navigation device of the seventh embodiment.

The display unit 5 displays the road map information and the like stored in the storage unit 3. The display unit 5 is described in detail with reference to FIG. 14. FIG. 14 is a view showing the interface of the navigation device 210. In the present embodiment, the display unit 5 displays a map 71, a vehicle location 72 of a vehicle equipped with the navigation device 210, a route (first travel route) 73 which a vehicle should follow, a signal location 74 of a target signal to be communicated, and target information 75.

The map 71 is displayed based on the traffic information stored in the storage unit 3. In FIG. 14, the scale of the map 71 is fixed, and the map can be scaled up or scaled down in response to the operation of a user. The vehicle location 72 of a vehicle equipped with the navigation device 210 is displayed on the map 71 by acquiring a GPS signal from the positioning unit 4 and calculating the location of the vehicle at the time of receiving the GPS signal. As the route 73 which a vehicle should follow, the route calculated by the computing unit 2 is displayed. The route calculation method is described in detail below. The signal locations 74 preliminarily stored in the storage unit 3 are displayed on the map 71. Although all of the target signals to be communicated are displayed on the map 71 in the present embodiment, only a signal with which communication has been established recently or a signal with which communication will be established next may be displayed. Furthermore, signals with which communication has been completed and signals with which communication has not been completed may be distinguished when they are displayed. The target information 75 includes the information acquired by the computing unit 2 and the information stored in the storage unit 3. Examples of the target information 75 include a target speed of a vehicle, a communication range of a signal, a target arrival time of arriving at a communication range of a signal, communication available hours of a signal with which communication should be established, a standby time until the communication with a signal with which communication should be established becomes available, a target arrival time (next target arrival time) of arriving at a communication range of a signal with which communication should be established next, and the number of signals with which communication should be established.

The vehicle information acquisition unit 6 acquires vehicle speed information, VICS (registered trademark) information received by a vehicle, road traffic congestion information, and road accident information.

Next, prior to the description of the route calculation method of the present embodiment, a route calculation method of a related invention is described with reference to FIG. 15 and Table 1.

Figure 15:
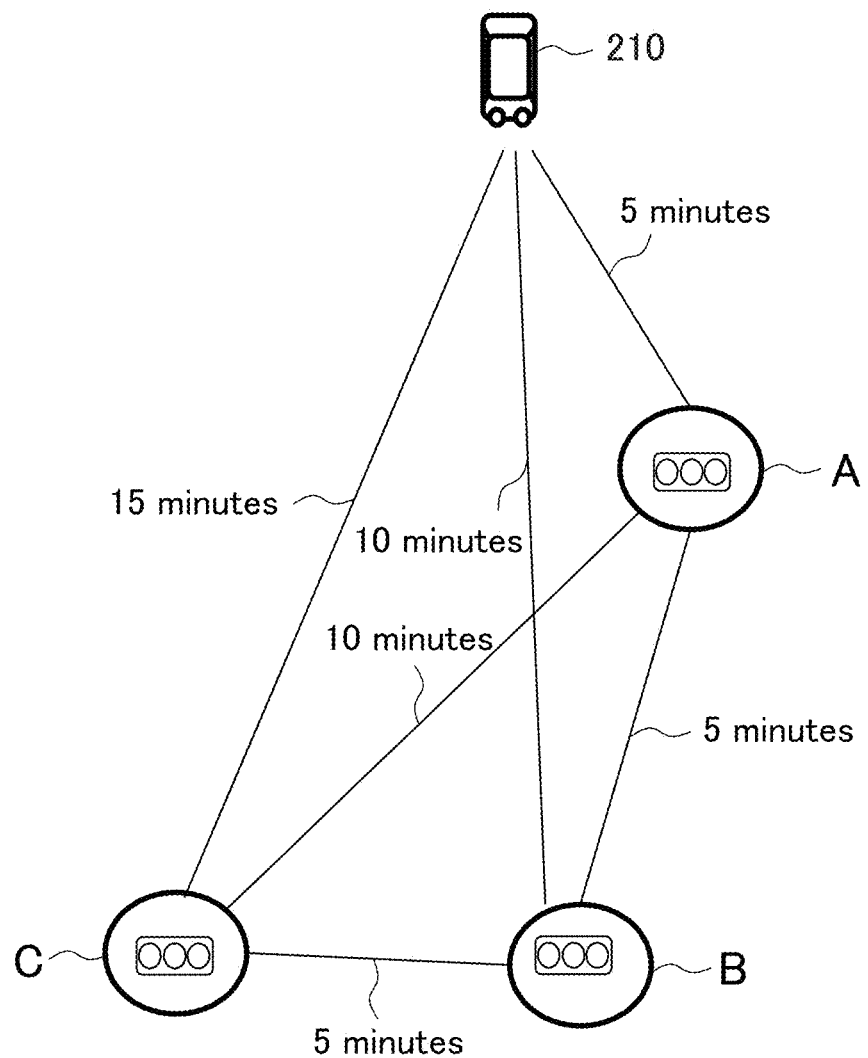
FIG. 15 is a view showing an example of a case where there are three signals in the seventh embodiment.

FIG. 15 is a view showing an example of a case where there are three signals, namely, signals A, B, and C. The route calculation method is described with reference to a case where there are three signals A, B, and C. In the method of the related invention, the location of a vehicle is acquired from the GPS. The required times with respect to all possible combinations of the communication sequences of signals A, B, and C are calculated based on the location information of signals A, B, and C preliminarily stored in the storage unit 3 and the location information of the vehicle acquired from the positioning unit 4. Then, the communication sequence that offers the shortest required time out of the calculated required times is selected as the first travel route.

The method of the related invention is described more in detail. With respect to each of the six communication sequences (route 1 to route 6) shown in Table 1, the required time for the whole journey is calculated. First, in route 1, the vehicle travels to the communication area of the signal A and communicates with the signal A in the communication area of the signal A. After the vehicle has communicated with the signal A in the communication area of the signal A, the vehicle travels from the communication area of the signal A to the communication area of the signal B and communicates with the signal B in the communication area of the signal B. After the vehicle has communicated with the signal B in the communication area of the signal B, the vehicle travels from the communication area of the signal B to the communication area of the signal C and communicates with the signal C in the communication area of the signal C.

In the related invention, the required time for the route 1 is calculated as follows. The travel time of the vehicle from the current location of the vehicle to the communication area of the signal A is calculated as 5 minutes. The travel time of the vehicle from the communication area of the signal A to the communication area of the signal B is calculated as 5 minutes. The travel time of the vehicle from the communication area of the signal B to the communication area of the signal C is calculated as 5 minutes. Then, by summing the travel times, the required time for the whole journey is calculated as 15 minutes.

In the same manner as the calculation method of route 1, the travel times of route 2 to route 6 are calculated. The results thereof are summarized in Table 1. Then, the communication sequence that offers the shortest travel time out of the calculated travel times (route 1) is selected.

TABLE 1

| Route | First branch estimated arrival time | Second branch estimated arrival time | Third branch estimated arrival time | Completion time of whole journey |
|---|---|---|---|---|
| Route 1 (A→B→C) | 14:35 | 14:40 | 14:45 | 15 min |
| Route 2 (A→C→B) | 14:35 | 14:45 | 14:50 | 20 min |
| Route 3 (B→A→C) | 14:40 | 14:45 | 14:55 | 25 min |
| Route 4 (B→C→A) | 14:40 | 14:45 | 14:55 | 25 min |
| Route 5 (C→A→B) | 14:45 | 14:55 | 14:50 | 20 min |
| Route 6 (C→B→A) | 14:45 | 14:50 | 14:55 | 25 min |

Figure 16:
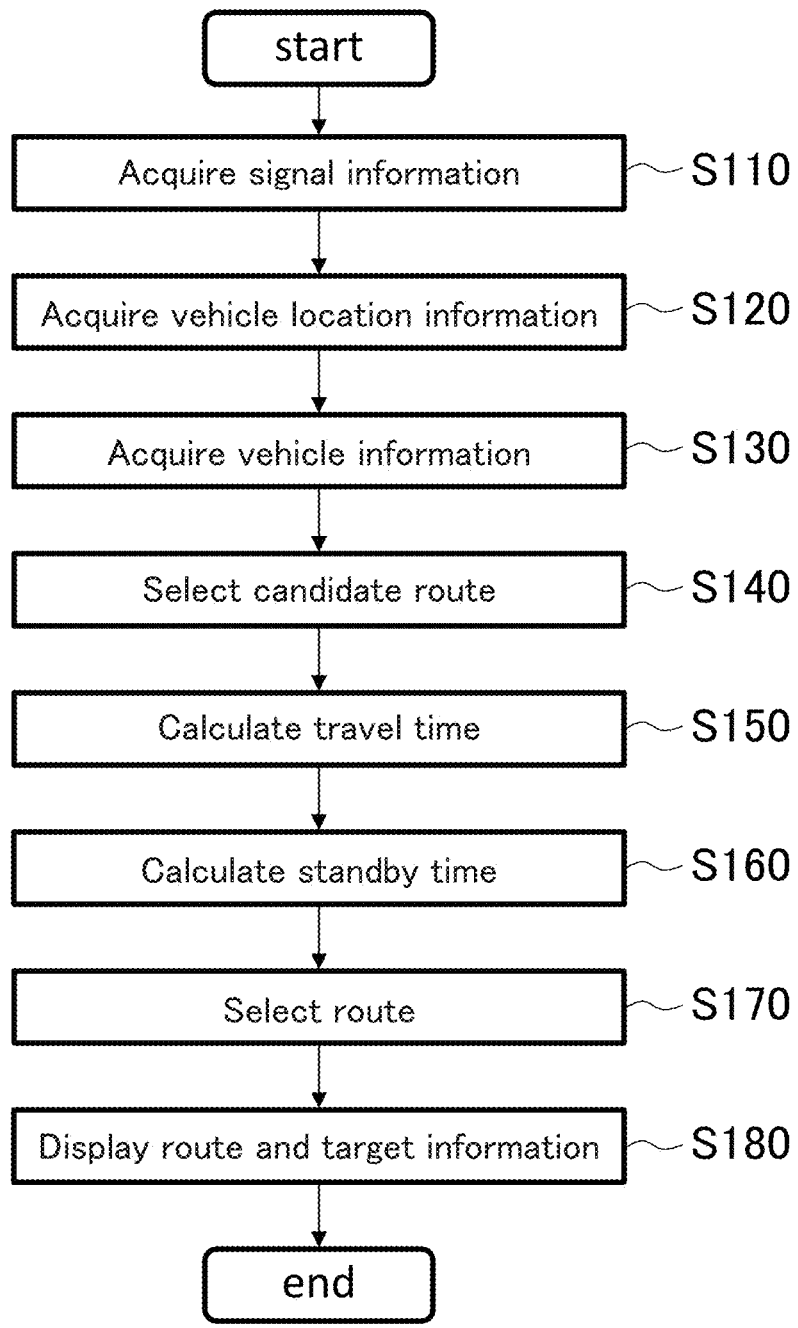
FIG. 16 is a flowchart showing route calculation of a navigation device of the seventh embodiment.

Next, the route calculation method of the present embodiment is described with reference to FIG. 16. FIG. 16 is a flowchart showing the route calculation by the computing unit 2. First, in step (hereinafter, S) 110, location information of each signal to be communicated, a communication area of each signal, and communication available hours of each signal are acquired from the storage unit 3.

Next, in S120, the computing unit 2 acquires the location information of the navigation device 210 based on the GPS information received by the positioning unit 4.

Next, in S130, the computing unit 2 acquires the passing time of a road section, i.e., the driving time information between the signals; the connection information for each road section; and the (average) speed of a road section from the storage unit 3.

Next, in S140, the computing unit 2 acquires a candidate communication sequence (candidate sequence) from the storage unit 3. In the seventh embodiment, all possible communication sequences of signals with which communication is established are acquired as candidate communication sequences. The acquisition of the candidate communication sequence is not limited to the acquisition of all possible communication sequences, but a predetermined number of communication sequences may be acquired as the candidate communication sequences.

Next, in S150, the computing unit 2 calculates the required time in a case where the vehicle travels according to each candidate communication sequence based on the communication area of each signal acquired in S110, the location information of the navigation device 210 acquired in S120, and the average speed of a road section and the distance information of a road section acquired in S130. Specifically, the computing unit 2 calculates the route information that offers the shortest road distance to the communication area of the first signal in the candidate communication sequence based on the location information of the navigation device 210 and the distance information of a road section. Then, the time required for arriving at the communication area of the first signal in the candidate communication sequence is calculated based on the route information that offers the shortest calculated distance and the average speed of a road section. Next, the route information that offers the shortest road distance from the communication area of the first signal in the candidate communication sequence to the communication area of the second signal in the candidate communication sequence is calculated. Then, the time required for traveling from the communication area of the first signal in the candidate communication sequence to the communication area of the second signal in the candidate communication sequence is calculated based on the route information that offers the shortest calculated distance and the average speed of a road section. The required times between the signals can be acquired by repeating the same procedure for the number of signals in the candidate communication sequence. By summing the calculated required times, the entire required time for the candidate communication sequence is calculated. Although the average speed of a road section assuming as the speed of the navigation device 210 is used as the vehicle speed in the present embodiment, instead of the average speed of a road section, the vehicle speed information acquired by the vehicle information acquisition unit 6, the speed of the navigation device 210 calculated based on the GPS signal received by the navigation device 210, and the like may be used. Furthermore, although the average speed of a road section and the distance information of a road section are used in the above-described calculation method, each required time may be calculated based on the passing time of a road section stored in the storage unit 3, i.e., the driving time information between the signals. Although the required time is calculated based on the average speed of a road section and the distance information of the road section in S150 of the present embodiment, the passing time of a road section may be used as the required time.

Next, in S160, the computing unit 2 calculates an estimated arrival time of arriving at the communication area of a signal by adding each required time acquired in S150 to the current time acquired by the positioning unit 4. The computing unit 2 calculates a standby time (standby time due to communication unavailable hours) until communication is established based on the estimated arrival time calculated and the communication available hours of each signal acquired in S110 with reference to the time when the vehicle arrives at the communication area of the signal.

Next, in S170, the computing unit 2 selects the candidate communication sequence that offers a route in which the time obtained by adding the standby time calculated in S160 to the entire required time for the candidate communication sequence calculated in S150 is the shortest as the first travel route (hereinafter, referred to as "shortest route information").

Next, in S180, the route selected by the computing unit 2 in S170 and the average speed of a road section used for calculating the route as a target speed which the vehicle should follow are displayed on the display unit 5. Furthermore, the target arrival time of arriving at the communication area, the communication available hours, and the next target arrival time are displayed on the display unit 5 as the target information 75.

A specific example of the route calculation method is described with reference to FIGS. 15 and 17 and Table 2. As shown in FIG. 15, the route calculation method is described with reference to a case where there are three signals, namely, signals A, B, and C. As shown in FIG. 15, the required time from the location of the vehicle to the communication area of the signal A is assumed to be 5 minutes, the required time from the location of the vehicle to the communication area of the signal B is assumed to be 10 minutes, the required time from the location of the vehicle to the signal C is assumed to be 15 minutes, the required time from the communication area of the signal A to the communication area of the signal B is assumed to be 5 minutes, the required time from the communication area of the signal A to the communication area of the signal C is assumed to be 10 minutes, and the required time from the communication area of the signal B to the communication area of the signal C is assumed to be 5 minutes.

Figure 17:
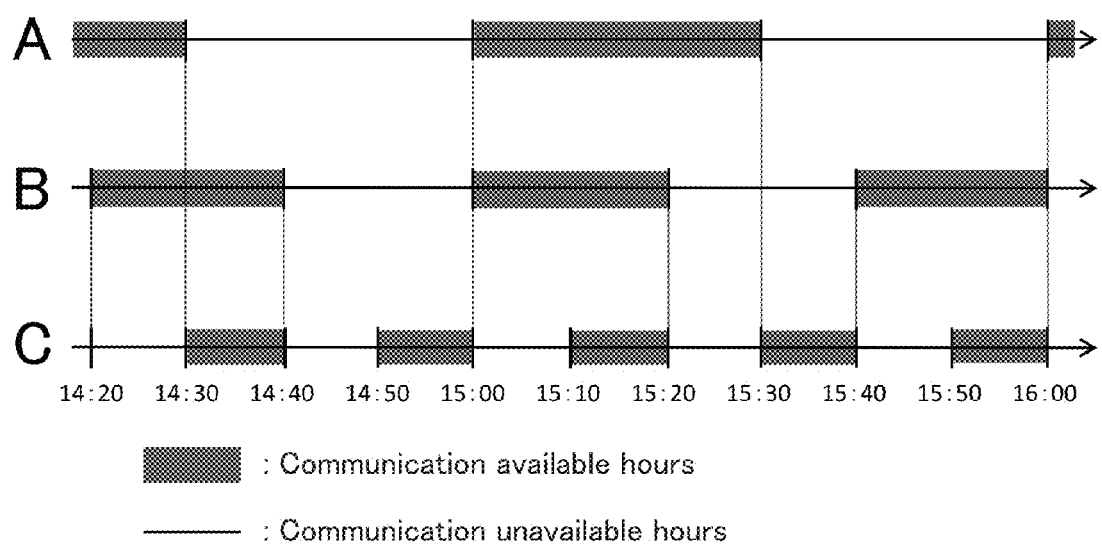
FIG. 17 is a view showing communication hours of signals in the seventh embodiment.

FIG. 17 is a view showing the communication available hours of the signals. The communication available hours of the signal A are 30 minutes. The signal A is configured such that its communication periodically becomes available after 30 minutes has passed from the communication available hours. The communication available hours of the signal B are 20 minutes. The signal B is configured such that its communication periodically becomes available after 20 minutes has passed from the communication available hours. The communication available hours of the signal C are 10 minutes. The signal C is configured such that its communication periodically becomes available after 10 minutes has passed from the communication available hours.

The method of calculating the completion time of the whole journey of route 1 is described with reference to Tables 2A and 2B. Table 2A is a table showing the arrival time at each branch station (signal) in the case of applying the present invention to the seventh embodiment of FIG. 15 and the communication available hours of each branch station. Table 2B is a table showing the required time and the standby time at each branch station. In the present embodiment, the time for communication between the navigation device 210 and each signal is assumed to be 0 minute. In Tables 2A and 2B, the first branch station, the second branch station, and the third branch station respectively represent the first signal, the second signal, and the third signal which the vehicle will pass. As a specific example, in the case of route 1, the first branch station, the second branch station, and the third branch station are the signal A, the signal B, and the signal C, respectively.

First, the required time (5 minutes) from the location of the vehicle to the communication area of the signal A, the required time (5 minutes) from the communication area of the signal A to the communication area of the signal B, and the required time (5 minutes) from the communication area of the signal B to the communication area of the signal C are summed to output the required time (15 minutes) for the whole journey of route 1. The required time may be calculated based on the communication area of the signal, the location information of the vehicle, and the vehicle speed information, for example. Specifically, the required time (5 minutes) from the location of the vehicle to the communication area of the signal A is calculated based on the communication area of the signal A which is the first signal in the candidate communication sequence, the vehicle location information, and vehicle speed information. Next, the required time (5 minutes) from the communication area of the signal A to the communication area of the signal B is calculated based on the communication area of the signal A, the communication area of the signal B with which communication is established next, and the vehicle speed information. Similarly, the required time (5 minutes) from the communication area of the signal B to the communication area of the signal C is calculated based on the communication area of the signal B, the communication area of the signal C with which communication is established next, and the vehicle speed information. Then, the calculated required times are summed to output the required time (15 minutes) for the whole journey of route 1.

Next, by adding the travel time (5 minutes) from the location of the vehicle to the communication area of the signal A to the current time (14:30) acquired by the positioning unit 4, the time of arriving at the communication area of the signal A (14:35) is calculated. The computing unit 2 calculates the standby time (25 minutes) until the communication with the signal A becomes available based on the calculated estimated arrival time (14:35) and the acquired communication available hours of the signal A (15:00 to 15:30). Furthermore, by adding the travel time (5 minutes) from the communication area of the signal A to the communication area of the signal B to the start time of the communication available hours of the signal A (15:00), the time of arriving at the communication area of the signal B (15:05) is calculated. The computing unit 2 calculates the standby time (5 minutes) until the communication with the signal B becomes available based on the calculated estimated arrival time (15:05) and the acquired communication available hours of the signal B (15:10 to 15:30). Then, by adding the travel time (5 minutes) from the communication area of the signal B to the communication area of the signal C to the start time of the communication available hours of the signal B (15:10), the time of arriving at the communication area of the signal C (15:15) is calculated. The computing unit 2 calculates the standby time (0 minute) until the communication with the signal C becomes available based on the calculated estimated arrival time (15:15) and the acquired communication available hours of the signal C (15:10 to 15:20). By summing the calculated standby times, the delay time (hereinafter, also referred to as the "entire standby time") (30 minutes) is calculated.

Next, the time obtained by summing the calculated required time (15 minutes) for the whole journey of route 1 and the entire standby time (30 minutes) is calculated as the entire required time for the candidate communication sequence route 1 (hereinafter, also referred to as the "completion time of the whole journey") (45 minutes).

In the same manner as described above, with respect to each of route 2 to route 6, by summing the entire travel time and the entire standby time, the entire required time for each of the candidate communication sequences is calculated. Then, the route that offers the shortest required time out of the candidate communication sequences (route 4, 30 minutes) is selected as the first travel route.

and provided on water and sewerage pipes and uses a navigation device for collecting sensor information such as vibration data acquired by the vibration sensors. The navigation device of the eighth embodiment is described in detail with reference to FIGS. 18 to 20.

Figure 18:
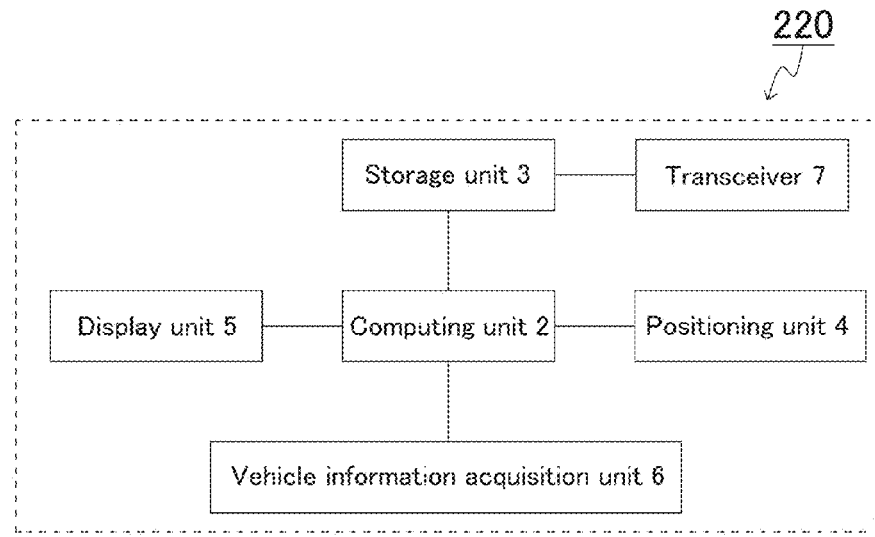
FIG. 18 is a block diagram showing a navigation device of the eighth embodiment.

FIG. 18 is a block diagram showing a navigation device 220 of the eighth embodiment. The navigation device 220 of the present embodiment includes a computing unit 2, an information storage unit 3, a positioning unit 4, a display unit 5, a vehicle information acquisition unit 6, and a transceiver 7. In the present embodiment, a vehicle is equipped with the navigation device 220. In the navigation device 220 of the present embodiment, the computing unit 2 is electrically connected to the storage unit 3, the positioning unit 4, the display unit 5, and the vehicle information

TABLE 2A

| Route | First branch estimated arrival time | First branch communication available hours | Second branch estimated arrival time | Second branch communication available hours | Third branch estimated arrival time | Third branch communication available hours |
|---|---|---|---|---|---|---|
| Route 1 (A→B→C) | 14:35 | 15:00~15:30 | 15:05 | 15:10~15:30 | 15:15 | 15:10~15:20 |
| Route 2 (A→C→B) | 14:35 | 15:00~15:30 | 15:10 | 15:10~15:20 | 15:15 | 15:40~16:00 |
| Route 3 (B→A→C) | 14:40 | 14:30~14:50 | 14:45 | 15:00~15:30 | 15:00 | 15:10~15:20 |
| Route 4 (B→C→A) | 14:40 | 14:30~14:50 | 14:45 | 14:50~15:00 | 15:00 | 15:00~15:30 |
| Route 5 (C→A→B) | 14:45 | 14:50~15:00 | 15:00 | 15:00~15:30 | 15:05 | 15:10~15:20 |
| Route 6 (C→B→A) | 14:45 | 14:50~15:00 | 14:55 | 15:10~15:30 | 15:15 | 15:00~15:30 |

TABLE 2B

| Route | First branch estimated arrival time | First branch standby time due to communication unavailable hours | Second branch estimated arrival time | Second branch standby time due to communication unavailable hours | Third branch estimated arrival time | Third branch standby time due to communication unavailable hours | Completion time of whole journey |
|---|---|---|---|---|---|---|---|
| Route 1 (A→B→C) | 5 min | 25 min | 5 min | 5 min | 5 min | 0 min | 45 min |
| Route 2 (A→C→B) | 5 min | 25 min | 10 min | 5 min | 5 min | 25 min | 70 min |
| Route 3 (B→A→C) | 10 min | 0 min | 5 min | 5 min | 10 min | 10 min | 40 min |
| Route 4 (B→C→A) | 10 min | 0 min | 5 min | 5 min | 10 min | 0 min | 30 min |
| Route 5 (C→A→B) | 15 min | 5 min | 10 min | 0 min | 5 min | 5 min | 40 min |
| Route 6 (C→B→A) | 15 min | 5 min | 5 min | 15 min | 5 min | 0 min | 45 min |

As described above, when the route is selected according to the related invention, route 1 with which the completion time of the whole journey is in fact 45 minutes is selected. However, according to the route calculation of the present invention, route 4 with which the completion time of the whole journey is 30 minutes can be selected.

By calculating the required time for a route in consideration of the communication available hours, it is possible to select the route (first travel route) that allows a user to complete the operation with shorter time than the case of calculating the required time for a route without considering the communication available hours.

(Eighth Embodiment)

The eighth embodiment discloses a configuration that establishes communication with vibration sensors (acoustic sensors), which are the branch stations, buried underground acquisition unit 6; and the transceiver 7 is electrically connected to the storage unit 3.

One of the features of the eighth embodiment is that the navigation device 220 includes the transceiver 7. Except for this, the navigation device 220 of the present embodiment has the same configuration as the navigation device 210 of the seventh embodiment. In the present embodiment, the description of the seventh embodiment can be referred to by replacing the "signal" with the "sensor". In the present embodiment, the transceiver 7 communicates with a vibration sensor (not shown) which is provided on a pipe for detecting water leakage from the pipe in a water and sewerage system buried underground and receives the vibration data of the pipe acquired by the vibration sensor. The received data is stored in the storage unit 3. Then, the information on a sensor with which communication has been completed is stored in the storage unit 3.

Figure 19:
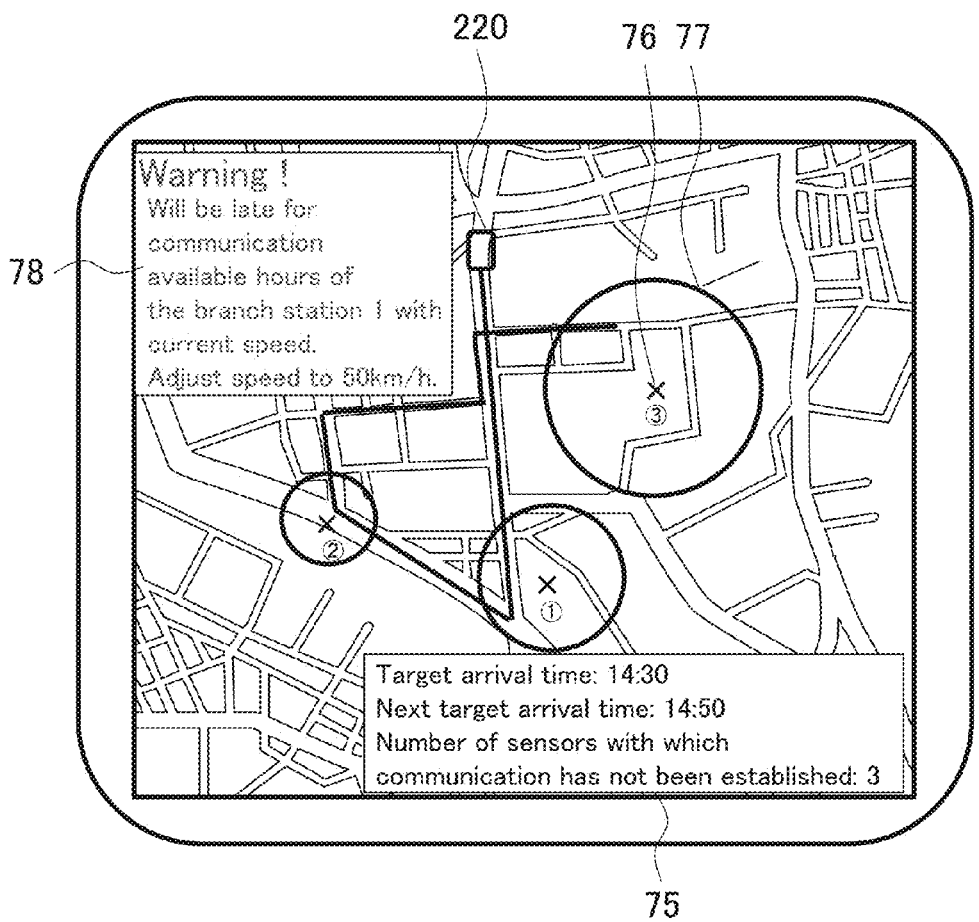
FIG. 19 is a view showing an interface of a navigation device of the eighth embodiment.

The display unit 5 (hereinafter, also referred to as an "interface screen") of the navigation device 220 is described with reference to FIG. 19. FIG. 19 is a view showing the interface screen of the navigation device 220. In the eighth embodiment, a sensor location 76 of a sensor buried underground and a sensor communication area 77 are displayed on the interface screen. The sensor is buried underground. Thus, the sensor is invisible to an operator of the vehicle equipped with the navigation device 220 and there is a possibility that the operator cannot find the real sensor location 76 and the real sensor communication area 77. Hence, the arrival at the sensor communication area 77 may be notified by a sound or a voice. Furthermore, if it is determined that the vehicle cannot arrive at the communication area within the target communication hours, for example, a warning 78 which tells the operator to "speed up" is displayed.

Figure 20:
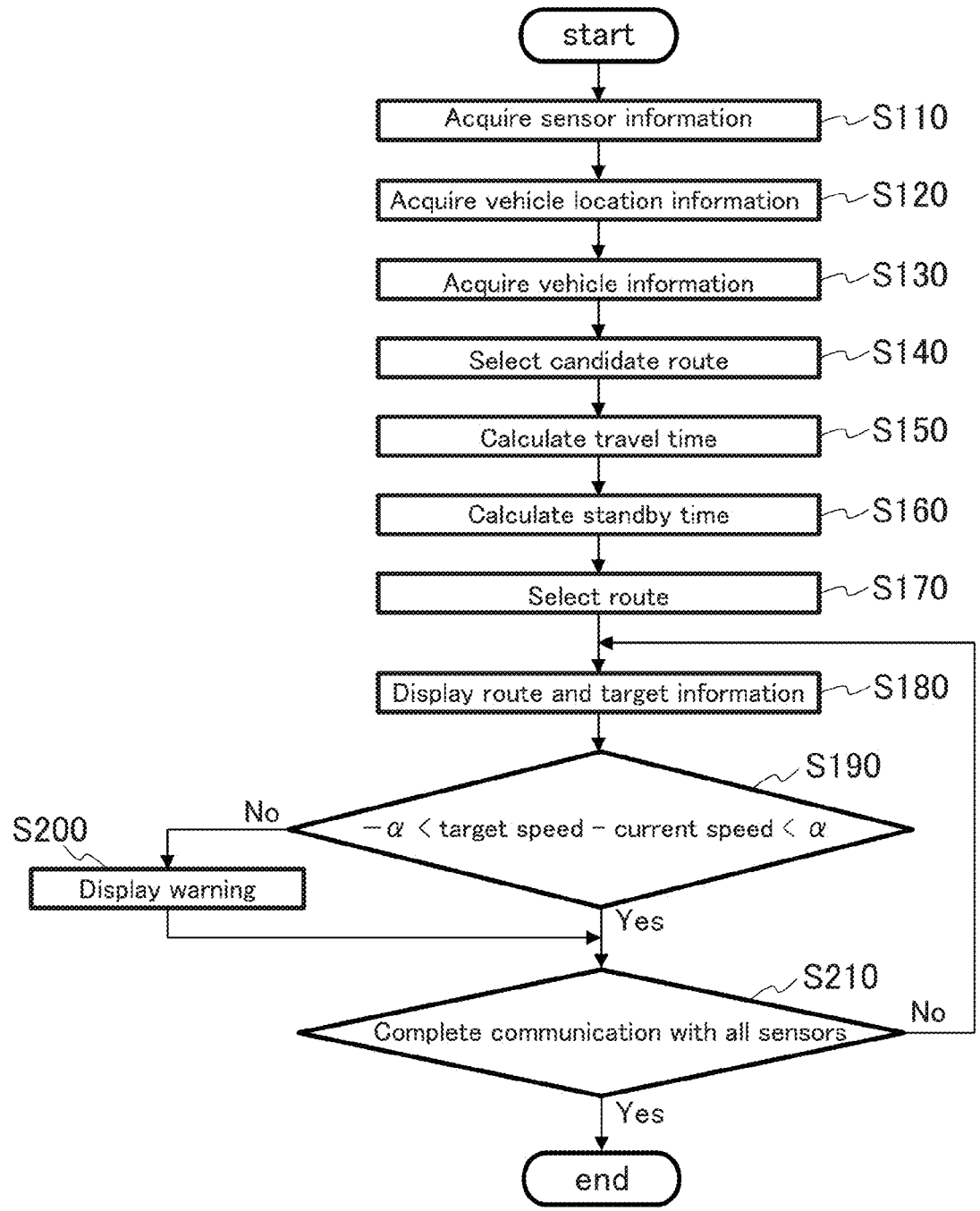
FIG. 20 is a flowchart showing route calculation of a navigation device of the eighth embodiment.

Next, the flowchart of the control of the navigation device 220 is described with reference to FIG. 20. FIG. 20 is a flowchart showing the route calculation of the navigation device 220. In FIG. 20, S110 to S170 are described in the seventh embodiment, and therefore the description is omitted.

The shortest route information is selected in S170, and thereafter the step advances to S180. In S180, the route acquired by the computing unit 2, a target time of arriving at the communication area of the sensor with which communication is established next, and the number of sensors with which communication has not been established yet are displayed on the display unit 5 as the target information 75. Here, the computing unit 2 calculates the number of sensors with which communication has not been established yet based on the number of sensors with which communication should be established and the number of sensors with which communication has been completed stored in the storage unit 3. Thereafter, the step advances to S190.

In S190, the target speed used for the route calculation and the vehicle speed information acquired by the vehicle information acquisition unit 6, i.e., the current travel speed of the navigation device 220 are acquired. Then, it is determined whether the absolute value of the difference therebetween is equal to or more than $\alpha$ km/h. When the absolute value of the difference is equal to or more than $\alpha$ km/h, the step advances to S200. On the other hand when the absolute value of the difference is less than $\alpha$ km/h, the step advances to S210. A predetermined value $\alpha$ is set such that the vehicle arrives at the communication area before or after the communication available hours of the sensor, for example. Although $\alpha$ is a fixed value (constant) in the present embodiment, $\alpha$ may be a variable value (variable) and $\alpha$ may be calculated successively while the vehicle is travelling. Furthermore, although the determination was made by comparing with a reference value in the present embodiment, the determination may be made by comparing with a predetermined numerical range (predetermined range) on the basis of whether the speed satisfied the numerical range, for example. Moreover, although the present embodiment discloses a configuration that gives a warning using the target speed and the current travel speed of the navigation device 220, for example, a target arrival location (hereinafter, referred to as a "target location") where the navigation device 220 should be present may be calculated based on the current time acquired from the vehicle information acquisition unit 6 and it may be determined whether to give a warning based on the difference between the target location and the location information of the navigation device 220 (hereinafter, also referred to as a "current location")

acquired by the positioning unit 4 or it may be determined whether to give a warning based on the target location, the current location, and the passing time of a road section.

In S200, when the absolute value of the difference between the target speed and the current travel speed of the navigation device 220 is equal to or more than $\alpha$ km/h, a warning given to an operator is displayed on the display unit 5. After S200, the step advances to S210.

In S210, it is determined whether the number of sensors with which communication has not been established yet calculated in S180 is 0. When the number of sensors with which communication has not been established yet is not 0, the step returns to S180. When the number of sensors with which communication has not been established yet is 0, the procedure in the flowchart is terminated.

In the above-described configuration, by calculating the required time for a route in consideration of the communication available hours, it is possible to select the route that allows a user to complete the operation with shorter time than the case of calculating the required time for a route only using the travel time without considering the communication available hours. Furthermore, by displaying a warning, it is possible to notify an operator that the arrival at the communication area is too early or too late.

(Ninth Embodiment)

The ninth embodiment discloses a configuration that establishes communication with sensors buried underground and uses a navigation device for collecting sensor information acquired by the sensors. The navigation device of the ninth embodiment is described in detail with reference to FIGS. 21 and 22.

The navigation device of the ninth embodiment has the same configuration as the navigation device shown in FIG. 18 described in the eighth embodiment, and therefore the description is omitted.

In the ninth embodiment, in the same manner as in the eighth embodiment, the transceiver 7 communicates with a vibration sensor (not shown) which is provided on a pipe for detecting water leakage from the pipe in a water and sewerage system buried underground and receives the vibration data of the pipe acquired by the vibration sensor. The received data is stored in the storage unit 3. Then, the information on a sensor with which communication has been completed is stored in the storage unit 3.

Figure 21:
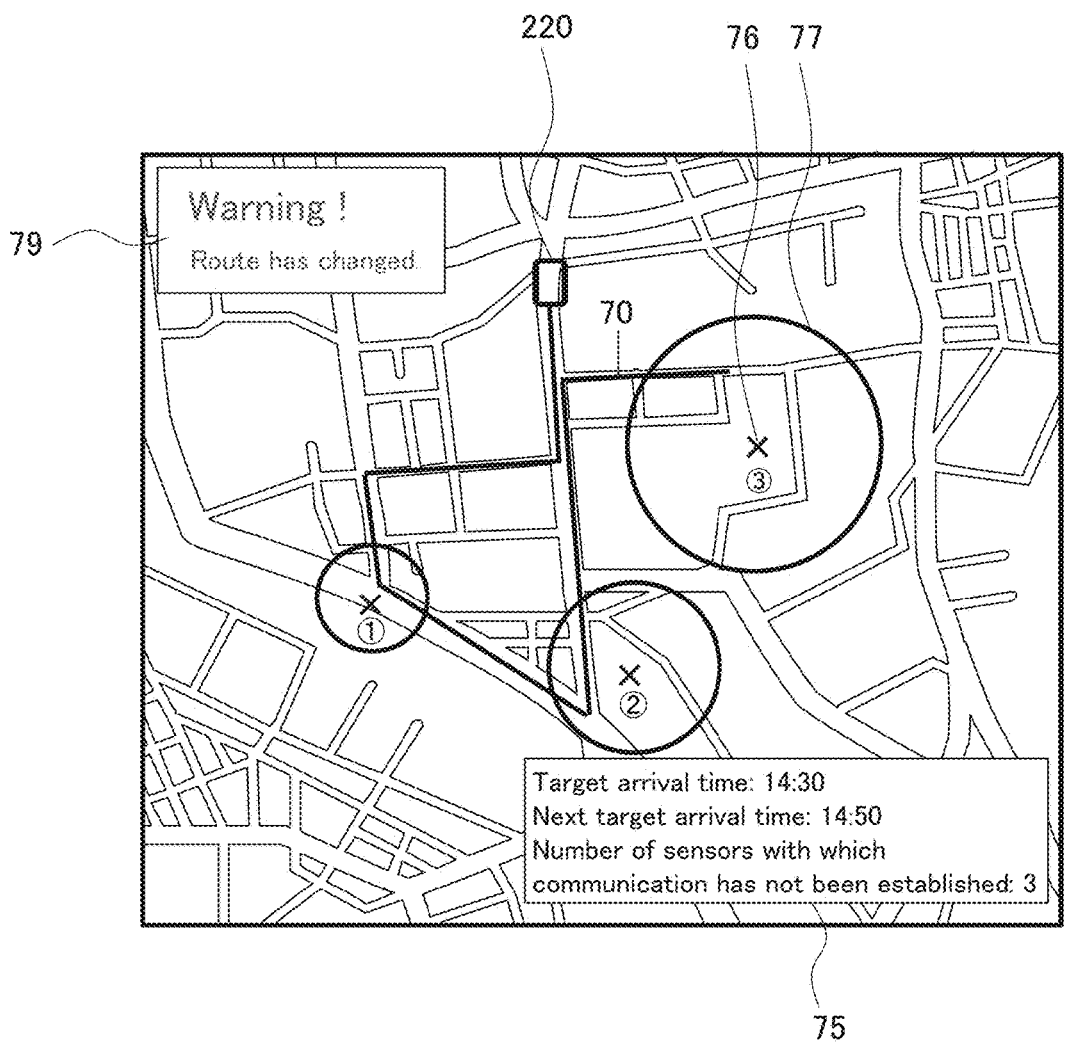
FIG. 21 is a view showing an interface of a navigation device of the ninth embodiment.

The interface screen of the navigation device 220 is described with reference to FIG. 21. FIG. 21 is a view showing the interface screen of the navigation device 220. In the ninth embodiment, the sensor location 76 of a sensor buried underground and the sensor communication area 77 are displayed on the interface screen. One of the features of the ninth embodiment is that a newly selected route 70 is displayed when it is determined that the vehicle cannot arrive at the communication area within the target communication available hours. Except for these points, the navigation device 220 of the present embodiment has the same configuration as the navigation device of the eighth embodiment. In the present embodiment, the descriptions of the seventh embodiment and the eighth embodiment can be referred to by replacing the "signal" with the "sensor". Examples of the case where it is determined that the vehicle cannot arrive at the communication area within the target communication available hours include the case where it is determined that the difference between the target speed and the travel speed is out of a predetermined range and the case where it is determined that the difference between the target arrival location and the location information of the mobile station is out of a predetermined range.

Figure 22:
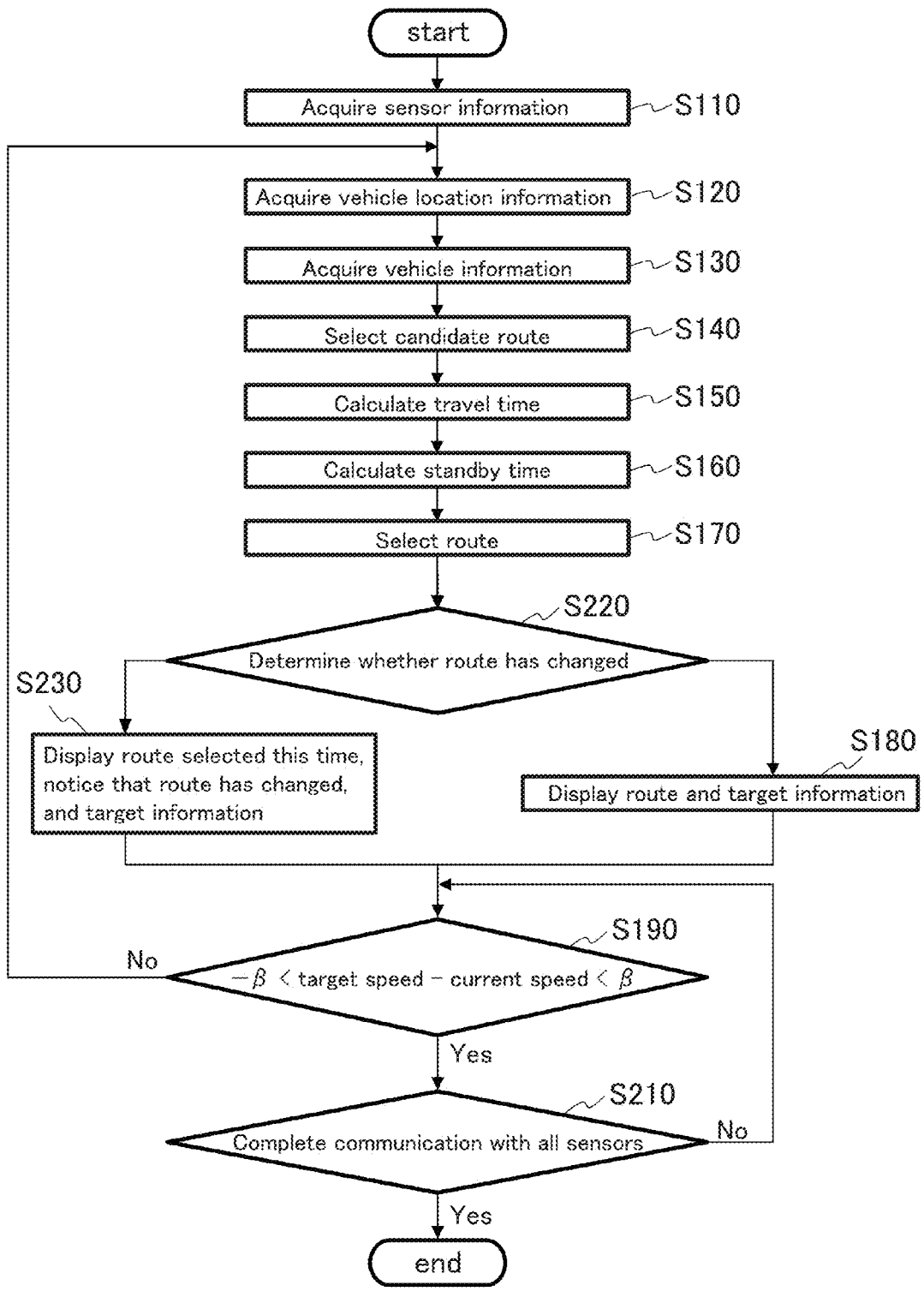
FIG. 22 is a flowchart showing route calculation of a navigation device of the ninth embodiment.

Next, the flowchart of the control of the navigation device 220 is described with reference to FIG. 22. FIG. 22 is a flowchart showing the route calculation of the navigation device 220. In the present embodiment, when it is determined that the vehicle cannot arrive at the communication area within the target communication available hours, the flowchart of the control of FIG. 22 is started. In FIG. 22, S110 to S170 are described in the seventh embodiment, and therefore the description is omitted.

The route is selected in S170, and thereafter the step advances to S220. In S220, the computing unit 2 determines whether the selected route is different from the previous route. When the selected route is the same as the previous route, the step advances to S180. When the selected route is different from the previous route, the step advances to S230.

In S180, the route acquired by the computing unit 2 in S170, a target arrival time of arriving at the communication area of the sensor with which communication is established next, and the number of sensors with which communication has not been established yet are displayed on the display unit 5 as the target information 75. Furthermore, a rerouting notice 79 that notifies a user that rerouting has been performed is displayed on the display unit 5. Here, the computing unit 2 calculates the number of sensors with which communication has not been established yet based on the number of sensors with which communication should be established and the number of sensors with which communication has been completed stored in the storage unit 3. Thereafter, the step advances to S190.

In S230, the route selected this time, a target time of arriving at the communication area, the next target arrival time, the number of sensors with which communication has not been established yet, and a notice that the route has changed are displayed on the display unit 5 as the target information 75. Here, the computing unit 2 calculates the number of sensors with which communication has not been established yet based on the number of sensors with which communication should be established and the number of sensors with which communication has been completed stored in the storage unit 3. Thereafter, the step advances to S190.

In S190, the target speed used for the route calculation and the current vehicle speed information acquired by the vehicle information acquisition unit 6 are acquired. Then, it is determined whether the absolute value of the difference therebetween is equal to or more than β km/h. When the absolute value of the difference is equal to or more than β km/h, the step advances to S120 to reselect the route. On the other hand, when the absolute value of the difference is less than β km/h, the step advances to S210. In the present embodiment, β may be a variable, and the step may advance to S120 when the target speed exceeds the legal speed of a road section on which the vehicle is currently driving. Furthermore, although it is determined whether to advance to S120 or S210 based on the target speed and the current vehicle speed information in the present embodiment, for example, it may be determined whether to advance to S120 or S210 based on the difference between the target location and the current location or it may be determined whether to advance to S120 or S210 based on the target location, the current location, and the passing time of a road section.

In S210, it is determined whether the number of sensors with which communication has not been established yet calculated in S180 or S230 is 0, i.e., it is determined whether communication has been completed with all sensors. When the number of sensors with which communication has not been established yet is not 0, the step returns to S190. When the number of sensors with which communication has not been established yet is 0, the procedure in the flowchart is terminated. Although the flowchart is terminated when the number of sensors with which communication has not been established yet is 0 in the present embodiment, for example, the flowchart may be terminated when the number of sensors with which communication has not been established yet is 1 or less. There is not much merit of rerouting when the number of sensors with which communication has not been established yet is 1 or less, for example. Thus, by terminating the flowchart when the number of sensors with which communication has not been established yet is 1 or less, for example, it is possible to reduce the computing load of the computing unit 2.

In the above-described configuration, by calculating the required time for a route in consideration of the communication available hours, it is possible to select the route that allows a user to complete the operation with shorter time than the case of calculating the required time for a route only using the travel time without considering the communication available hours. Furthermore, by displaying newly selected route, an operator can operate while checking an optimal route all the time.

(Tenth Embodiment)

The tenth embodiment discloses a configuration that establishes communication with sensors, which are the branch stations, buried underground and uses a navigation device for collecting sensor information acquired by the sensors. The navigation device of the tenth embodiment is described in detail with reference to FIG. 23.

The navigation device and the interface of the navigation device of the tenth embodiment has the same configuration as the navigation device shown in FIG. 18 described in the eighth embodiment, and therefore the description is omitted. In the present embodiment, the descriptions of the seventh embodiment to the ninth embodiment can be referred to by replacing the "signal" with the "sensor".

When the vehicle delays, the navigation device 220 of the present embodiment detects whether the delay is a delay (unavoidable delay) caused by traffic congestion or a delay (avoidable delay) by other reasons. When the delay is caused by traffic congestion delay (unavoidable delay), the navigation device displays a newly selected route. On the other hand, when the delay is caused by other reasons (avoidable delay), the navigation device displays a warning.

Figure 23:
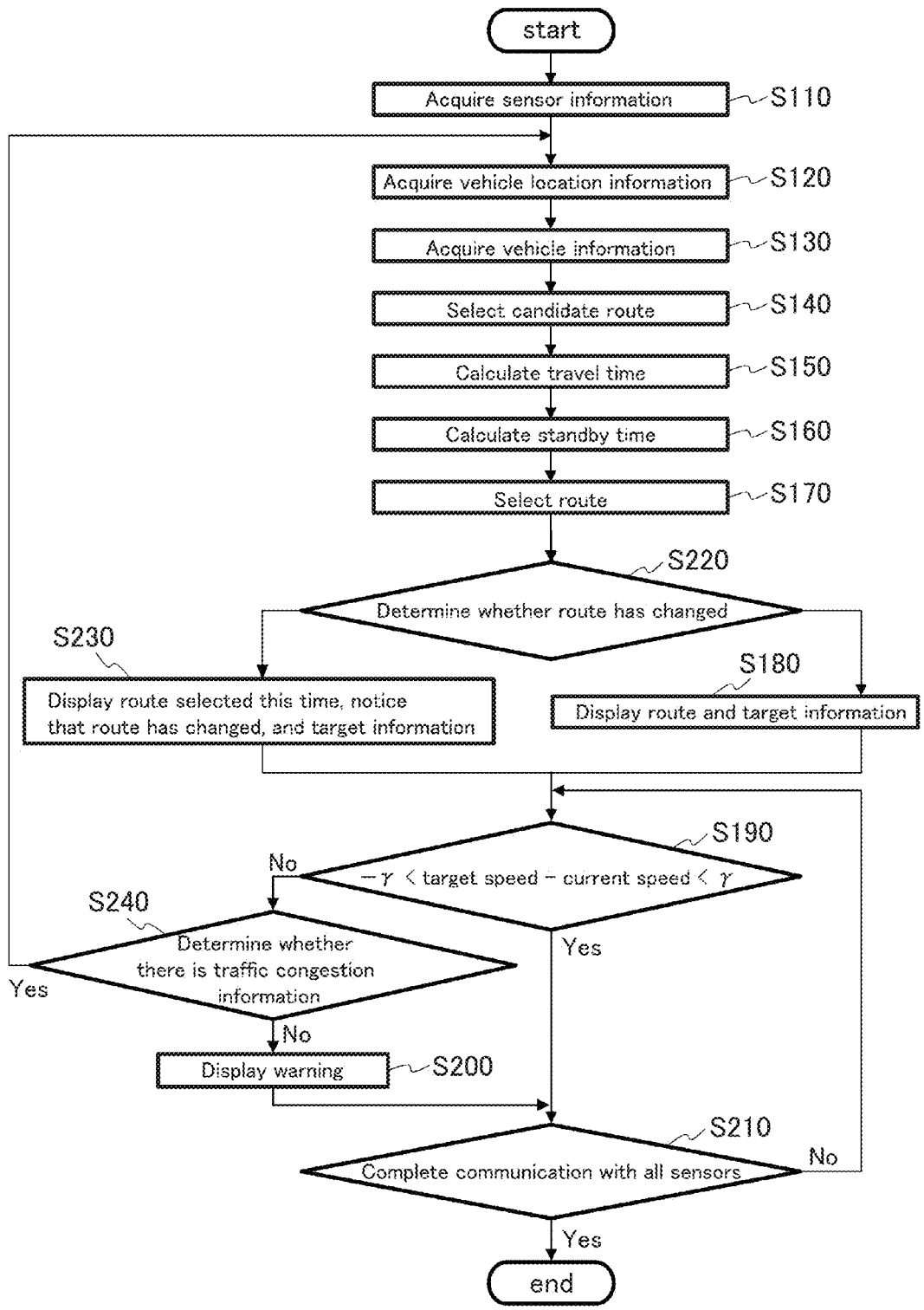
FIG. 23 is a flowchart showing route calculation of a navigation device of the tenth embodiment.

Next, the flowchart of the control of the navigation device 220 is described with reference to FIG. 23. FIG. 23 is a flowchart showing the route calculation of the navigation device 220. In FIGS. 23, S110 to S230 are described in the foregoing embodiments (seventh embodiment to the ninth embodiment), and therefore the description is omitted.

In S190, the target speed used for the route calculation and the current vehicle speed information acquired by the vehicle information acquisition unit 6 are acquired. Then, it is determined whether the absolute value of the difference therebetween is equal to or more than γ km/h. When the absolute value of the difference is equal to or more than γ km/h, the step advances to S240. On the other hand, when the absolute value of the difference is less than γ km/h, the step advances to S210. Although γ is a predetermined constant in the present embodiment, γ may be a variable and may be varied according to the legal speed, for example.

In 5240, traffic congestion information acquired by the vehicle information acquisition unit 6 is acquired and it is determined whether there is traffic congestion on the route selected by the computing unit 2 in S170 based on the acquired traffic congestion information. When there is traffic congestion, the step returns to S120 to perform the route calculation again. When there is no traffic congestion, the step advances to S200 to display a warning 78 on the display unit 5 as shown in FIG. 23.

In the above-described configuration, a new route can be displayed when there is an unavoidable delay. Furthermore, when there is an avoidable delay, by giving a warning, it is possible to provide an operator with supports according to situations. Thus, it is possible to improve the efficiency of the operation.

(Eleventh Embodiment)

The program of the present embodiment is a program that can execute the route display method according to the present invention or the navigation method according to the present invention on a computer. The program of the present embodiment may be recorded in a recording medium, for example. The recording medium is not particularly limited, and examples thereof include random access memories (RAMs), read-only memories (ROMs), hard disks (HDs), optical disks, and floppy (registered trademark) disks (FDs).

(Twelfth Embodiment)

Figure 24:
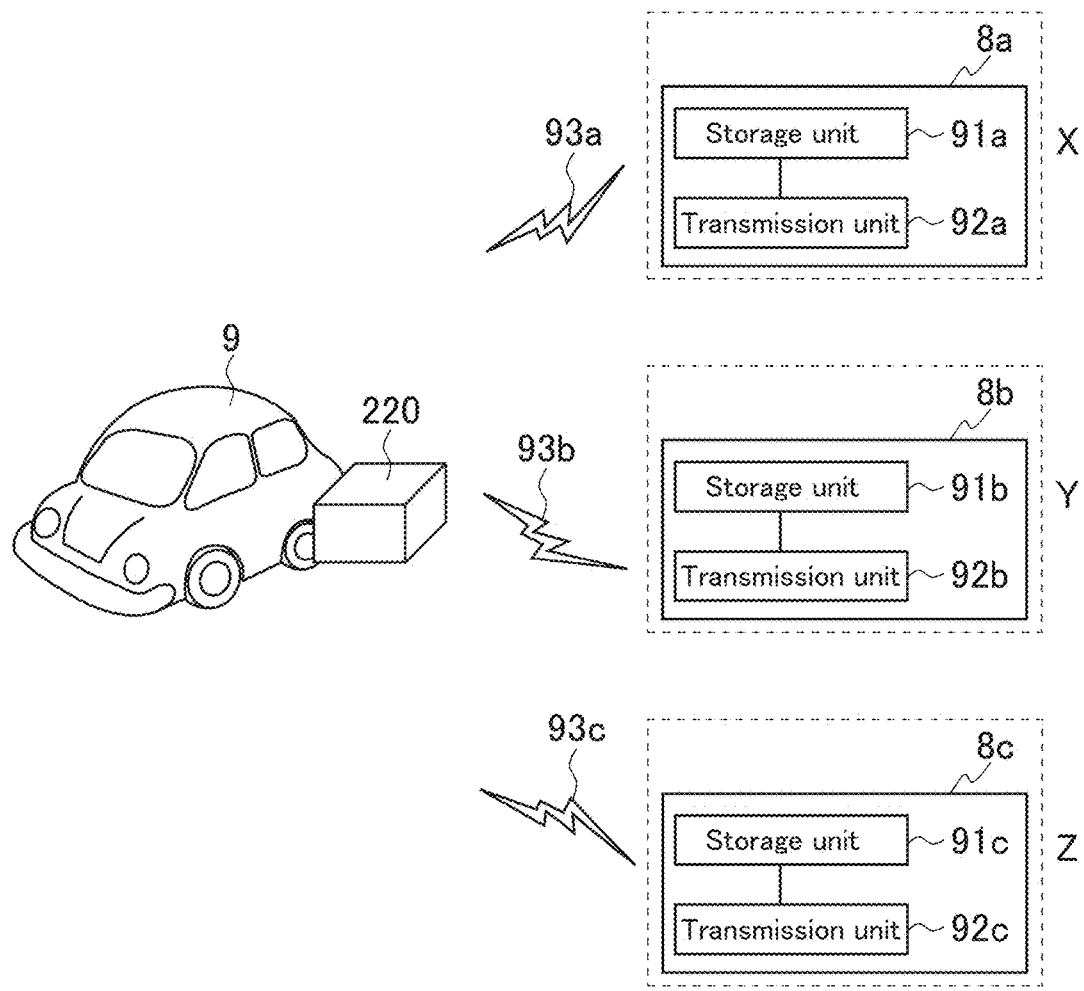
FIG. 24 is a conceptual diagram of a communication system of the twelfth embodiment.

FIG. 24 shows an example of the configuration of a communication system using the navigation device of the present invention. FIG. 24 is a conceptual diagram of the communication system of the present embodiment. As shown in FIG. 24, the communication system includes branch station 8a, 8b, and 8c and a vehicle 9 equipped with the navigation device 220. The branch stations 8a, 8b, and 8c are provided at places X, Y, and Z, respectively. The branch station 8a includes a storage unit 91a and a transmission unit 92a. The storage unit 91a is connected to the transmission unit 92a. The branch station 8b includes a storage unit 91b and a transmission unit 92b. The storage unit 91b is connected to the transmission unit 92b. The branch station 8c includes a storage unit 91c and a transmission unit 92c. The storage unit 91c is connected to the transmission unit 92c. The transmission units 92a, 92b, and 92c transmit data to the transceiver 7 of the navigation device 220 via wireless communication 93a, 93b, and 93c, respectively.

In the communication system of the present embodiment, first, the sensor (not shown) of the branch station 8a collects measured data. Next, the measured data is stored in the storage unit 91a. Then, the transmission unit 92a transmits the data to the transceiver 7 of the navigation device 220 mounted on the vehicle 9 via the wireless communication 93a. Also in the branch stations 8b and 8c, data is transmitted to the transceiver 7 of the navigation device 220 mounted on the vehicle 9 in the same manner as described above. The vehicle 9 has to make rounds of the places where the branch stations 8a, 8b, and 8c are placed. Hence, the vehicle 9 travels the places X, Y, and Z according to the travel route selected by the navigation device 220. As described above, in the communication system of the present embodiment, it is possible to select the route that allows a user to complete the operation with shorter time than the case of calculating the required time for a route without considering the communication available hours. Thus, according to the communication method of the present embodiment, the measured data can be retrieved efficiently.

The seventh embodiment to the tenth embodiment and the twelfth embodiment each have a configuration that a vehicle establishes communication. However, the use of the route calculation device and the navigation device of the present invention is not limited to the use in a vehicle. The route calculation device and the navigation device of the present invention may have a configuration that communication is established by a walker using a portable terminal such as a cellular phone, for example. Furthermore, the application of the present invention is not limited to a vehicle, and may be applied to transports such as aircrafts, helicopters, and ships, for example.

While the present invention has been described above with reference to embodiments, the present invention is by no means limited thereto. Various changes and modifications that may become apparent to those skilled in the art may be made in the configuration and specifics of the present invention without departing from the scope of the present invention.

This application claims priority from Japanese Patent Application No. 2014-059410 filed on Mar. 24, 2014. The entire subject matter of the Japanese Patent Application is incorporated herein by reference.

A part of or the whole of the above-described embodiments can be described as the following supplementary notes. However, the present invention is by no means limited thereto.

[Supplementary Note 1]

A route calculation device comprising:

a communication available hours acquisition unit that acquires communication available hours of a plurality of branch stations that establish communication with a mobile station;

a reference time acquisition unit that acquires a reference time;

a road information acquisition unit that acquires time information of a road section; and a route calculation unit that calculates a first travel route that offers a shortest required time for stopping by the branch stations based on the communication available hours, the reference time, and the time information of a road section.

[Supplementary Note 2]

The route calculation device according to supplementary note 1, further comprising:

a candidate sequence acquisition unit that acquires a plurality of candidate sequences of stopping by the branch stations;

a travel time calculation unit that calculates a travel time in a case where the mobile station stops by the branch stations according to each candidate sequence based on the time information of a road section;

a delay time calculation unit that calculates a delay time until communication between the mobile station and each branch station is established after the mobile station has arrived at the branch station with reference to each candidate sequence based on the communication available hours, the reference time, and the time information of a road section; and a required time calculation unit that calculates a required time with reference to each candidate sequence based on the travel time and the delay time, wherein the route calculation unit calculates the candidate sequence that offers the shortest required time as the first travel route.

[Supplementary Note 3]

The route calculation device according to supplementary note 1 or 2, further comprising:

a speed information acquisition unit that acquires speed information of a road section;

a travel speed acquisition unit that acquires a travel speed;

a target speed acquisition unit that acquires a target speed based on the first travel route and the speed information of a road section; and a speed determination unit that determines whether a difference between the target speed and the travel speed is out of a predetermined range, wherein when it is determined that the difference between the target speed and the travel speed is out of a predetermined range, the route calculation unit calculates a second travel route that offers a shortest required time for stopping by the branch stations based on the communication available hours, the reference time, and the time information of a road section.

[Supplementary Note 4]

The route calculation device according to supplementary note 3, further comprising:

a traffic congestion information acquisition unit that acquires information on a location of traffic congestion; and a traffic congestion determination unit that determines whether there is traffic congestion on the first travel route based on the first travel route and the information on a location of traffic congestion, wherein when it is determined that the difference between the target speed and the travel speed is out of a predetermined range and that there is traffic congestion on the first travel route, the route calculation unit calculates the second travel route that offers the shortest required time for stopping by the branch stations.

[Supplementary Note 5]

The route calculation device according to supplementary note 1 or 2, further comprising:

a speed information acquisition unit that acquires speed information of a road section;

an elapsed time acquisition unit that acquires an elapsed time after the mobile station has started to travel;

a current location acquisition unit that acquires a current location;

a target arrival location calculation unit that calculates a target arrival location based on the speed information of a road section and the elapsed time; and a location determination unit that determines whether a locational difference between the target arrival location and the current location is out of a predetermined range, wherein when it is determined that the locational difference between the target arrival location and the current location is out of a predetermined range, the route calculation unit calculates a second travel route that offers a shortest required time for stopping by the branch stations based on the communication available hours, the reference time, and the time information of a road section.

[Supplementary Note 6]

The route calculation device according to supplementary note 5, further comprising:

a traffic congestion information acquisition unit that acquires information on a location of traffic congestion; and a traffic congestion determination unit that determines whether there is traffic congestion on the first travel route based on the first travel route and the information on a location of traffic congestion, wherein when it is determined that the locational difference between the target arrival location and the current location is out of a predetermined range and that there is traffic congestion on the first travel route, the route calculation unit calculates the second travel route that offers the shortest required time for stopping by the branch stations.

[Supplementary Note 7]

A navigation device comprising:

the route calculation device according to any one of supplementary notes 1 to 6, comprising:

the communication available hours acquisition unit;

the reference time acquisition unit;

the road information acquisition unit; and the route calculation unit; and a display unit, wherein the display unit displays the first travel route calculated by the route calculation device.

[Supplementary Note 8]

The navigation device according to supplementary note 7, wherein when the speed determination unit of the route calculation device determines that the difference between the target speed and the travel speed acquired by the route calculation device is out of a predetermined range, the display unit displays a warning.

[Supplementary Note 9]

The navigation device according to supplementary note 7, further comprising:

a travel route determination unit that determines whether the second travel route is different from the first travel route, wherein when the travel route determination unit determines that the second travel route calculated by the route calculation device is different from the first travel route, the display unit displays the second travel route calculated by the route calculation device and a notice that a travel route has changed.

[Supplementary Note 10]

The navigation device according to supplementary note 7, wherein when the speed determination unit of the route calculation device determines that the difference between the target speed and the travel speed acquired by the route calculation device is out of a predetermined range and the traffic congestion determination unit of the route calculation device determines that there is no traffic congestion on the first travel route, the display unit displays a warning.

[Supplementary Note 11]

The navigation device according to supplementary note 7, wherein when the location determination unit of the route calculation device determines that the locational difference between the target arrival location and the current location acquired by the route calculation device is out of a predetermined range, the display unit displays a warning.

[Supplementary Note 12]

The navigation device according to supplementary note 7, wherein when the location determination unit of the route calculation device determines that the locational difference between the target arrival location and the current location acquired by the route calculation device is out of a predetermined range and the traffic congestion determination unit of the route calculation device determines that there is no traffic congestion on the first travel route, the display unit displays a warning.

[Supplementary Note 13]

The navigation device according to any one of supplementary notes 7 to 12, wherein the display unit additionally displays the target speed acquired by the route calculation device.

[Supplementary Note 14]

The navigation device according to any one of supplementary notes 7 to 13, wherein the route calculation unit of the route calculation device calculates an estimated arrival time of arriving at a next branch station to be stopped by based on the reference time, the first travel route, and the time information of a road section acquired by the route calculation device, and the display unit displays the estimated arrival time.

[Supplementary Note 15]

The navigation device according to any one of supplementary notes 7 to 14, further comprising:

a communication range acquisition unit that acquires a communication range of the branch station, wherein the display unit displays the communication range of the branch station.

[Supplementary Note 16]

The navigation device according to supplementary note 15, wherein the display unit displays the branch stations.

[Supplementary Note 17]

The navigation device according to supplementary note 15 or 16, wherein the display unit displays a branch station with which communication has not been completed out of the branch stations.

[Supplementary Note 18]

The navigation device according to any one of supplementary notes 15 to 17, wherein the display unit displays the number of branch stations with which communication has not been completed out of the branch stations.

[Supplementary Note 19]

A route calculation method comprising following steps:

acquiring communication available hours of a plurality of branch stations that establish communication with a mobile station;

acquiring a reference time;

acquiring time information of a road section; and calculating a first travel route that offers a shortest required time for stopping by the branch stations based on the communication available hours, the reference time, and the time information of a road section.

[Supplementary Note 20]

The route calculation method according to supplementary note 19, further comprising following steps:

acquiring a plurality of candidate sequences of stopping by the branch stations;

calculating a travel time in a case where the mobile station stops by the branch stations of each candidate sequence based on the time information of a road section;

calculating a delay time until communication between the mobile station and each branch station is established after the mobile station has arrived at the branch station with reference to each candidate sequence based on the communication available hours, the reference time, and the time information of a road section; and calculating a required time with reference to each candidate sequence based on the travel time and the delay time, wherein the route calculation unit calculates the candidate sequence that offers the shortest required time as the first travel route.

[Supplementary Note 21]

The route calculation method according to supplementary note 19 or 20, further comprising following steps:

acquiring speed information of a road section;

acquiring a travel speed;

acquiring a target speed based on the first travel route and the speed information of a road section; and determining whether a difference between the target speed and the travel speed is out of a predetermined range, wherein when it is determined that the difference between the target speed and the travel speed is out of a predetermined range, a second travel route that offers a shortest required time for stopping by the branch stations is calculated based on the communication available hours, the reference time, and the time information of a road section in the route calculation step.

[Supplementary Note 22]

The route calculation method according to supplementary note 21, further comprising following steps:

acquiring information on a location of traffic congestion; and determining whether there is traffic congestion on the first travel route based on the first travel route and the information on a location of traffic congestion, wherein when it is determined that the difference between the target speed and the travel speed is out of a predetermined range and that there is traffic congestion on the first travel route, a second travel route that offers the shortest required time for stopping by the branch stations is calculated in the route calculation step.

[Supplementary Note 23]

The route calculation method according to supplementary note 19 or 20, further comprising following steps:

acquiring speed information of a road section;

acquiring an elapsed time after the mobile station has started to travel;

acquiring a current location;

calculating a target arrival location based on the speed information of a road section and the elapsed time; and determining whether a locational difference between the target arrival location and the current location is out of a predetermined range, wherein when it is determined that the locational difference between the target arrival location and the current location is out of a predetermined range, a second travel route that offers a shortest required time for stopping by the branch stations is calculated based on the communication available hours, the reference time, and the time information of a road section in the route calculation step.

[Supplementary Note 24]

The route calculation method according to supplementary note 23, further comprising following steps:

acquiring information on a location of traffic congestion; and determining whether there is traffic congestion on the first travel route based on the first travel route and the information on a location of traffic congestion, wherein when it is determined that the locational difference between the target arrival location and the current location is out of a predetermined range and that there is traffic congestion on the first travel route, the second travel route that offers the shortest required time for stopping by the branch stations is calculated in the route calculation step.

[Supplementary Note 25]

A navigation method comprising:

the route calculation method according to any one of supplementary notes 19 to 24 comprising:

the communication available hours acquisition step;
the reference time acquisition step;
the road information acquisition step; and
the route calculation step; and following step:
displaying, wherein
the first travel route calculated by the route calculation method is displayed in the display step.

[Supplementary Note 26]
The navigation method according to supplementary note 25, wherein
when it is determined that the difference between the target speed and the travel speed acquired by the route calculation method is out of a predetermined range in the speed determination step of the route calculation method, a warning is displayed in the display step.

[Supplementary Note 27]
The navigation method according to supplementary note 25, further comprising following step:
determining whether the second travel route is different from the first travel route, wherein
when it is determined that the second travel route calculated by the route calculation method is different from the first travel route in the travel route determination step, the second travel route calculated in the route calculation method and a notice that a travel route has changed are displayed in the display step.

[Supplementary Note 28]
The navigation method according to supplementary note 25, wherein
when it is determined that the difference between the target speed and the travel speed acquired by the route calculation method is out of a predetermined range in the speed determination step of the route calculation method and that there is no traffic congestion on the first travel route in the traffic congestion determination step of the route calculation method, a warning is displayed in the display step.

[Supplementary Note 29]
The navigation method according to supplementary note 25, wherein
when it is determined that the locational difference between the target arrival location and the current location acquired by the route calculation method is out of a predetermined range in the location determination step of the route calculation method, a warning is displayed in the display step.

[Supplementary Note 30]
The navigation method according to supplementary note 25, wherein
when it is determined that the locational difference between the target arrival location and the current location acquired by the route calculation method is out of a predetermined range in the location determination step of the route calculation method and that there is no traffic congestion on the first travel route in the traffic congestion determination step of the route calculation method, a warning is displayed in the display step.

[Supplementary Note 31]
The navigation method according to any one of supplementary notes 25 to 30, wherein
the target speed acquired by the route calculation method is additionally displayed in the display step.

[Supplementary Note 32]
The navigation method according to any one of supplementary notes 25 to 31, wherein
an estimated arrival time of arriving at a next branch station to be stopped by is calculated based on the reference time, the first travel route, and the time information of a road section acquired by the route calculation method in the route calculation step of the route calculation method, and
the estimated arrival time is displayed in the display step.

[Supplementary Note 33]
The navigation method according to any one of supplementary notes 25 to 32, further comprising following step:
acquiring a communication range of the branch station, wherein
the communication range of the branch station is displayed in the display step.

[Supplementary Note 34]
The navigation method according to supplementary note 33, wherein
the branch stations are displayed in the display step.

[Supplementary Note 35]
The navigation method according to supplementary note 33 or 34, wherein
a branch station with which communication has not been completed out of the branch stations is displayed in the display step.

[Supplementary Note 36]
The navigation method according to any one of supplementary notes 33 to 35, wherein
the number of branch stations with which communication has not been completed out of the branch stations is displayed in the display step.

[Supplementary Note 37]
A program that can execute the route calculation method according to any one of supplementary notes 19 to 24 or the navigation method according to any one of supplementary notes 25 to 36 on a computer.

[Supplementary Note 38]
A computer-readable recording medium recorded with the program according to supplementary note 37.

[Supplementary Note 39]
A communication system comprising:
a plurality of branch stations each communicatable within a specific area; and
a mobile station that establishes communication with the branch stations, wherein
the mobile station can establish communication with the communicatable branch stations via wireless communication,
the branch station comprises a storage unit that stores data and a transmission unit that transmits the data stored in the storage unit to the mobile station, and
the mobile station comprises the navigation device according to any one of supplementary notes 7 to 18 and communication means that establishes communication with the branch stations.

INDUSTRIAL APPLICABILITY

The present invention can be applied, for example, to on-vehicle navigation devices, portable terminals, and the like.

EXPLANATION OF REFERENCE NUMERALS 2 computing unit
3 storage unit
4 positioning unit
5 display unit
6 vehicle information acquisition unit
7 transceiver
8 *a*, 8*b*, 8*c* branch station
9 vehicle 11 communication available hours acquisition unit
12 reference time acquisition unit
13 road information acquisition unit
14 candidate sequence acquisition unit
21 travel time calculation unit
22 delay time calculation unit
23 required time calculation unit
31, 32 route calculation unit
41 speed information acquisition unit
42 travel speed acquisition unit
43 target speed acquisition unit
44 traffic congestion information acquisition unit
45 elapsed time acquisition unit
46 current location acquisition unit
47 target arrival location calculation unit
51 speed determination unit
52 traffic congestion determination unit
53 location determination unit
61 display unit
70 newly selected route
71 map
72 vehicle location
73 route (which vehicle should follow)
74 signal location
75 target information
76 sensor location
77 communication range
78 warning
79 notice for rerouting
80, 81, 82, 83, 84 data processing unit
91a, 91b, 91c storage unit
92a, 92b, 92c transmission unit
93a, 93b, 93c wireless communication
100, 110, 120, 130, 140 route calculation device
200, 210, 220 navigation device

The invention claimed is:

1. A route calculation device comprising at least one processor configured to:
acquire communication available hours of a plurality of branch stations which are devices that collect information and transmit the information to a mobile station with which communication is established;
acquire a reference time comprising one of a current time of the mobile station and a departure time at which the mobile station starts traveling;
acquire time information of a road section comprising information on a travel time from a current location of the mobile station to each of the plurality of branch stations and information on a travel time between the branch stations;
calculate a first travel route that offers a shortest required time for stopping by the branch stations based on the communication available hours, the reference time, and the time information of a road section;
acquire speed information of the road section;
acquire a travel speed;
acquire a target speed based on the first travel route and the speed information of the road section;
acquire information on a location of traffic congestion;
determine whether a difference between the target speed and the travel speed is outside a predetermined speed range;
determine whether there is traffic congestion on the first travel route based on the first travel route and the information on the location of traffic congestion;
when it is determined that the difference between the target speed and the travel speed is outside the predetermined speed range and that there is traffic congestion on the first travel route, calculate a second travel route that offers a shortest required time for stopping by the branch stations based on the communication available hours, the reference time, and the time information of the road section.

2. The route calculation device according to claim 1, the processor further configured to:
acquire a plurality of candidate sequences of stopping by the plurality of branch stations;
calculate a travel time in a case in which the mobile station stops by the plurality of branch stations according to each candidate sequence based on the time information of the road section;
calculate a delay time until communication between the mobile station and each of the plurality of branch station is established after the mobile station has arrived at the branch station with reference to each candidate sequence based on the communication available hours, the reference time, and the time information of the road section; and
calculate a required time with reference to each candidate sequence based on the travel time and the delay time, wherein
the processor is further configured to calculate the candidate sequence that offers a shortest required time as the first travel route.

3. The route calculation device according to claim 1, the processor further configured to:
acquire an elapsed time after the mobile station has started to travel;
acquire a current location;
calculate a target arrival location based on the speed information of the road section and the elapsed time; and
determine whether a locational difference between the target arrival location and the current location is outside of a predetermined location range, wherein
when it is determined that the locational difference between the target arrival location and the current location is outside of the predetermined location range, the processor is configured to calculate a second travel route that offers a shortest required time for stopping by the plurality of branch stations based on the communication available hours, the reference time, and the time information of the road section.

4. The route calculation device according to claim 3, the processor further configured to:
when it is determined that the locational difference between the target arrival location and the current location is out of the predetermined location range and that there is traffic congestion on the first travel route, calculate the second travel route that offers the shortest required time for stopping by the plurality of branch stations.

5. A navigation device comprising:
the route calculation device according to claim 1; and
a display, wherein
the display displays the first travel route calculated by the route calculation device.

6. The navigation device according to claim 5, the processor further configured to:
determine whether the second travel route is different from the first travel route, and
when the processor determines that the second travel route calculated by the route calculation device is different from the first travel route, the display displays the second travel route calculated by the route calculation device and a notice that a travel route has changed.

7. The navigation device according to claim 5, wherein when it is determined that the difference between the target speed and the travel speed acquired by the route calculation device is out of the predetermined speed range and that there is no traffic congestion on the first travel route, the display displays a warning.

8. The navigation device according to claim 5, wherein the processor of the route calculation device is further configured to
acquire an elapsed time after the mobile station has started to travel;
acquire a current location;
calculate a target arrival location based on the speed information of the road section and the elapsed time; and
determine whether a locational difference between the target arrival location and the current location is outside of a predetermined location range, wherein
when it is determined that the locational difference between the target arrival location and the current location acquired by the route calculation device is outside of the predetermined range, the display displays a warning.

9. The navigation device according to claim 5, wherein the processor of the route calculation device is further configured to
acquire an elapsed time after the mobile station has started to travel;
acquire a current location;
calculate a target arrival location based on the speed information of the road section and the elapsed time;
determine whether a locational difference between the target arrival location and the current location is outside of a predetermined location range; and
when it is determined that the locational difference between the target arrival location and the current location acquired by the route calculation device is outside of the predetermined location range and that there is no traffic congestion on the first travel route, the display displays a warning.

10. The navigation device according to claim 5, wherein the display additionally displays the target speed acquired by the route calculation device.

11. The navigation device according to claim 5, wherein the processor is further configured to calculate an estimated arrival time of arriving at a next branch station to be stopped by based on the reference time, the first travel route, and the time information of the road section, and
the display displays the estimated arrival time.

12. The navigation device according to claim 5, the processor further configured to:
acquire a communication range of a branch station of the plurality of branch stations, wherein
the display displays the communication range of the branch station.

13. The navigation device according to claim 12, wherein the display displays the branch stations.

14. The navigation device according to claim 12, wherein the display displays a branch station with which communication has not been completed out of the branch stations.

15. The navigation device according to claim 12, wherein the display displays the number of branch stations with which communication has not been completed out of the branch stations.

16. A route calculation method comprising following steps:
acquiring communication available hours of a plurality of branch stations which are devices that collect information and transmit the information to a mobile station with which communication is established;
acquiring a reference time comprising one of a current time of the mobile station and a departure time at which the mobile station starts traveling;
acquiring time information of a road section comprising information on a travel time from a current location of the mobile station to each of the plurality of branch stations and information on a travel time between the branch stations;
calculating a first travel route that offers a shortest required time for stopping by the branch stations based on the communication available hours, the reference time, and the time information of a road section;
acquiring speed information of the road section;
acquiring a travel speed;
acquiring a target speed based on the first travel route and the speed information of the road section;
acquiring information on a location of traffic congestion;
determining whether a difference between the target speed and the travel speed is outside a predetermined speed range;
determining whether there is traffic congestion on the first travel route based on the first travel route and the information on the location of traffic congestion;
when it is determined that the difference between the target speed and the travel speed is outside the predetermined speed range and that there is traffic congestion on the first travel route, calculating a second travel route that offers a shortest required time for stopping by the branch stations based on the communication available hours, the reference time, and the time information of the road section.

17. The route calculation method according to claim 16, further comprising following steps:
acquiring a plurality of candidate sequences of stopping by the plurality of branch stations;
calculating a travel time in a case in which the mobile station stops by the plurality of branch stations of each candidate sequence based on the time information of the road section;
calculating a delay time until communication between the mobile station and each of the plurality of branch station is established after the mobile station has arrived at the branch station with reference to each candidate sequence based on the communication available hours, the reference time, and the time information of the road section; and
calculating a required time with reference to each candidate sequence based on the travel time and the delay time, wherein
the route calculation step further comprises calculating the candidate sequence that offers a shortest required time as the first travel route.

18. A route calculation device comprising at least one processor configured to:
acquire communication available hours of a plurality of branch stations which are devices that collect information and transmit the information to a mobile station with which communication is established;

acquire a reference time comprising one of a current time of the mobile station and a departure time at which the mobile station starts traveling;

acquire time information of a road section comprising information on a travel time from a current location of the mobile station to each of the plurality of branch stations and information on a travel time between the branch stations;

calculate a first travel route that offers a shortest required time for stopping by the branch stations based on the communication available hours, the reference time, and the time information of a road section;

acquire an elapsed time after the mobile station has started to travel;

acquire a current location;

calculate a target arrival location based on the speed information of the road section and the elapsed time; and determine whether a locational difference between the target arrival location and the current location is outside of a predetermined location range, wherein when it is determined that the locational difference between the target arrival location and the current location is outside of the predetermined location range, the processor is configured to calculate a second travel route that offers a shortest required time for stopping by the plurality of branch stations based on the communication available hours, the reference time, and the time information of the road section.

19. A navigation device comprising:

a route calculation device comprising at least one processor configured to:

acquire communication available hours of a plurality of branch stations which are devices that collect information and transmit the information to a mobile station with which communication is established;

acquire a reference time comprising one of a current time of the mobile station and a departure time at which the mobile station starts traveling;

acquire time information of a road section comprising information on a travel time from a current location of the mobile station to each of the plurality of branch stations and information on a travel time between the branch stations; and calculate a first travel route that offers a shortest required time for stopping by the branch stations based on the communication available hours, the reference time, and the time information of a road section;

acquire a communication range of a branch station of the plurality of branch stations; and a display, wherein the display displays the first travel route calculated by the route calculation device and displays the communication range of the branch station.

* * * * *